United States Patent
Romeo

(10) Patent No.: US 6,336,656 B1
(45) Date of Patent: Jan. 8, 2002

(54) INFLATABLE TUBULAR TORSO RESTRAINT SYSTEM WITH PIVOTING UPPER ANCHOR POINT ATTACHMENT

(75) Inventor: David J. Romeo, Thayne, WY (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/577,659

(22) Filed: May 25, 2000

Related U.S. Application Data

(63) Continuation-in-part of application No. 09/169,302, filed on Oct. 9, 1998, now Pat. No. 6,126,194, which is a continuation-in-part of application No. 08/829,750, filed on Mar. 31, 1997, now Pat. No. 5,839,753, said application No. 09/577,659, filed on May 25, 2000, and a continuation-in-part of application No. 09/525,033, filed on Mar. 14, 2000.

(51) Int. Cl.⁷ ............................................... B60R 21/18
(52) U.S. Cl. ........................ 280/733; 280/808; 297/483
(58) Field of Search ............................. 280/808, 801.2, 280/802, 805, 807, 728.1, 733, 743.1; 297/483

(56) References Cited

U.S. PATENT DOCUMENTS

| | | |
|---|---|---|
| 2,834,606 A | 5/1958 | Betrand |
| 3,040,383 A | 6/1962 | Nassimbene |

(List continued on next page.)

FOREIGN PATENT DOCUMENTS

| | | |
|---|---|---|
| DE | 38 20 145 A1 | 1/1990 |
| DE | 92 11 423.7 | 8/1992 |
| DE | 41 16 162 A | 11/1992 |
| DE | 42 38 427 A1 | 5/1993 |
| DE | 43 07 175 A1 | 9/1993 |
| DE | 295 17 953 U1 | 2/1996 |

(List continued on next page.)

OTHER PUBLICATIONS

Popular Science, "Side Protection Coming?".
Aviation Week and Space Technology, Army Develops Crew Restraint System, vol. 120 No. 3, Jan. 16, 1984, New York, USA, p.187.
Arizona Republic Newspaper, "Car Air Bags for Side Hits in the Works," Mar. 1994.
Livbag Product Brochure, "Specification for Euroflator Gas Generator and Safety Data Sheet," Aug. 1992.

*Primary Examiner*—Paul N. Dickson
*Assistant Examiner*—Deanne Draper
(74) *Attorney, Agent, or Firm*—Shaw Pittman LLP

(57) ABSTRACT

A seat restraint system whose torso belt includes an inflatable structure that inflates upon impact to protect the occupants of a vehicle such as an automobile. The torso belt is secured to an anchor arm that is pivotally mounted on a side surface of a seat of the vehicle or a side structure of the vehicle. The anchor arm is rotationally biased to remove slack in the torso belt and locks up in the event of a vehicle crash or sudden stop. The inflatable structure is linked to a gas generator and crash sensor. The gas generator may be mounted in the seat or within the anchor arm itself. When an impact above a predetermined level of severity is detected, the gas generator is ignited, inflating the inflatable structure which contracts in length as it inflates. In a preferred embodiment, the inflatable structure is a braided tube. As the braided tube inflates, the diameter of the tube increases significantly and its length decreases significantly, due to the orientation of the fibers comprising the braided tube. The contraction in length pretensions the seat belt system by pulling any additional slack out of the seat belt systems. In a frontal impact, the inflated structure restricts the forward motion of an occupant and distributes crash loads over a larger occupant surface area to reduce both primary and secondary injuries. In a side impact, the inflated structure passes over the occupant's shoulder, restricts occupant motion, distributes crash loads and provides head and neck protection.

50 Claims, 22 Drawing Sheets

U.S. PATENT DOCUMENTS

| | | | |
|---|---|---|---|
| 3,316,337 | A | 4/1967 | North |
| 3,642,303 | A | 2/1972 | Irish et al. |
| 3,682,498 | A | 8/1972 | Rutzki |
| 3,687,485 | A | 8/1972 | Campbell |
| 3,730,551 | A | 5/1973 | Sack et al. |
| 3,784,223 | A | 1/1974 | Hass et al. |
| 3,792,873 | A | 2/1974 | Buchner et al. |
| 3,807,754 | A | 4/1974 | Rodenbach et al. |
| 3,841,654 | A | 10/1974 | Lewis |
| 3,844,581 | A | 10/1974 | Fox |
| 3,866,940 | A | 2/1975 | Lewis |
| 3,888,503 | A | 6/1975 | Hamilton |
| 3,888,504 | A | 6/1975 | Bonn et al. |
| 3,892,425 | A | 7/1975 | Sakairi et al. |
| 3,905,615 | A | 9/1975 | Schulman |
| 3,929,205 | A | 12/1975 | Takada et al. |
| 3,948,541 | A | 4/1976 | Schulman |
| 3,953,049 | A | 4/1976 | Surace et al. |
| 3,953,640 | A | 4/1976 | Takada |
| 3,970,329 | A | 7/1976 | Lewis |
| 4,348,037 | A | 9/1982 | Law et al. |
| 4,592,523 | A | 6/1986 | Herndon |
| 4,805,930 | A | 2/1989 | Takada |
| 4,880,254 | A * | 11/1989 | Muller .................... 280/808 |
| 4,921,735 | A | 5/1990 | Bloch |
| 4,971,354 | A | 11/1990 | Kim |
| 5,018,762 | A | 5/1991 | Suzuki et al. |
| 5,039,035 | A | 8/1991 | Fitzpatrick |
| 5,062,662 | A | 11/1991 | Cameron |
| 5,251,931 | A | 10/1993 | Semechena et al. |
| 5,282,648 | A | 2/1994 | Peterson |
| 5,303,953 | A | 4/1994 | Kamiyama et al. |
| 5,312,131 | A | 5/1994 | Kitagawa et al. |
| 5,322,322 | A | 6/1994 | Bark et al. |
| 5,346,250 | A | 9/1994 | Kamiyama |
| 5,354,096 | A | 10/1994 | Tanaka et al. |
| 5,383,713 | A | 1/1995 | Kamiyama et al. |
| 5,385,367 | A | 1/1995 | Tanaka et al. |
| 5,390,953 | A | 2/1995 | Tanaka et al. |
| 5,393,091 | A | 2/1995 | Tanaka et al. |
| 5,445,411 | A | 8/1995 | Kamiyama et al. |
| 5,464,246 | A | 11/1995 | Castro et al. |
| 5,465,999 | A | 11/1995 | Tanaka et al. |
| 5,466,002 | A | 11/1995 | Tanaka et al. |
| 5,480,181 | A | 1/1996 | Bark et al. |
| 5,839,753 | A | 11/1998 | Yaniv et al. |
| 6,010,151 | A * | 1/2000 | Honda .................... 280/733 |
| 6,116,637 | A * | 9/2000 | Takeuchi et al. ............. 280/733 |
| 6,126,194 | A * | 10/2000 | Yaniv et al. ................ 280/733 |
| 6,276,721 | B1 * | 8/2001 | Romeo .................... 280/808 |

FOREIGN PATENT DOCUMENTS

| | | |
|---|---|---|
| FR | 2442058 | 6/1980 |
| FR | 2606719 | 5/1988 |
| FR | 2675098 | 10/1992 |
| GB | 1-320475 | 6/1973 |
| GB | 1381999 | 1/1975 |
| GB | 2191450 | 12/1987 |
| GB | 2261636 | 5/1993 |
| GB | 2262720 | 6/1993 |
| GB | 2 269 851 A | 2/1994 |
| JP | 1-156155 | 6/1989 |
| JP | 6-237-837 | 9/1990 |
| JP | 3-92451 | 4/1991 |
| JP | 3-276844 | 12/1991 |
| JP | 5-193430 | 8/1993 |
| JP | 5-208653 | 8/1993 |
| WO | WO90/11914 | 10/1990 |
| WO | WO/9419215 | 9/1994 |

* cited by examiner

HEAD DISPLACEMENT = 20.5-IN.
HEAD ROTATION = 110°

CONVENTIONAL THREE-POINT SEAT
BELT BASELINE FORWARD IMPACT

HEAD DISPLACEMENT = 18.0-IN.
HEAD ROTATION = 61°

AIRBELT-1 FORWARD IMPACT

HEAD DISPLACEMENT = 14.5-IN.
HEAD ROTATION = 42°

AIRBEST-2 FORWARD IMPACT

HEAD DISPLACEMENT = 5.0-IN.
HEAD ROTATION = 28°

PRESENT INVENTION
FORWARD IMPACT

HEAD DISPLACEMENT= 23.0-IN.
HEAD ROTATION = 86°

CONVENTIONAL THREE-POINT
SEAT BELT BASELINE
LATERAL IMPACT

HEAD DISPLACEMENT= 24.0-IN.
HEAD ROTATION = 74°

AIRBELT-1 LATERAL IMPACT

HEAD DISPLACEMENT= 20.5-IN.
HEAD ROTATION = 15°

AIRBELT-2 LATERAL IMPACT

HEAD DISPLACEMENT=15.3-IN.
HEAD ROTATION = 50°

PRESENT INVENTION
LATERAL IMPACT

INFLATABLE TUBULAR TORSO RESTRAINT SYSTEM WITH PIVOTING UPPER ANCHOR POINT ATTACHMENT

This application is a continuation-in-part application of U.S. application Ser. No. 09/169,302, filed Oct. 9, 1998 (the '302 application), now U.S Pat. No. 6,126,194 which is a continuation-in-part application of U.S. application Ser. No. 08/829,750, filed Mar. 31, 1997 (the '750 application), now U.S. Pat. No. 5,839,753. The present application, claims priority from the '750 and '302 applications, which are incorporated herein by reference. This application is also a continuation-in-part application of U.S. application Ser. No. 09/525,033, filed Mar. 14, 2000, entitled "Pivoting Seat Belt Upper Anchor Point Attachment."

BACKGROUND

1. Field of the Invention

This invention relates to a system for restraining the body of an occupant in a vehicle to reduce the extent and severity of injuries during a crash. More specifically, the invention relates to a seat belt restraint system which incorporates an inflatable tubular section in the torso section of the belt. The inflatable tubular section can be made of a woven or braided tube of continuous high-strength fibers or can alternatively be made from an extruded net or from a woven net. The restraint system reduces the extent and severity of both primary and secondary injuries to vehicle occupants.

2. Background of the Invention

Conventional seat belts are designed to protect the occupants of vehicles such as automobiles, trucks, vans, airplanes and helicopters from primary injuries during an accident. Primary injuries are injuries caused by the initial impact of the occupants against the interior of the vehicle. However, the protection provided by conventional seat belts against primary injuries may sometimes be inadequate. For example, slack in the seat belts may lead to unnecessarily serious primary injuries. In side impacts conventional belts do not provide occupant head protection on the struck side of the vehicle. Moreover, the seat belts themselves may often be responsible for secondary injuries, since the load from the seat belts is distributed only over small areas of the occupant's body. However, some prior art belts have tried to lessen primary injuries by incorporating an inflating mechanism into the seat belt restraint.

For example, U.S. Pat. No. 5,282,648, which is incorporated by reference herein, discloses an inflatable body and head restraint system, wherein inflatable bladders are attached to the shoulder straps of a harness restraint. The bladders are stowed partially underneath and partially on top of harness straps. This configuration provides stability and prevents the bladders from rolling out of position during inflation. During a crash, the bladders inflate to protect the upper body, primarily the head and neck of the occupant.

Additionally, U.S. Pat. Nos. 3,948,541 and 3,905,615 to Schulman disclose another inflatable body and head restraint system, wherein a bladder is securely affixed to shoulder straps and a lap belt. The bladder has chin, chest, and pelvic bags. Upon impact, the bladder automatically inflates to cushion the pelvic areas and to prevent forward rotation of the head. However, upon inflation the bladder tends to roll out from its position under the shoulder straps. Also, because the bladders are constricted by the harness, portions of the bladder are subjected to high pressures, which can lead to splitting of the bladder.

Simple inflatable body restraints are also disclosed in U.S. Pat. Nos. 3,682,498 and 4,348,037 to W. Rutzki and B. Law et al, respectively. These patents disclose inflatable protective devices that are located in or under the seat harnesses to which they are attached. These inflatable body restraints are subject to roll-out and seam or web splitting problems.

In yet another prior art seat belt disclosed in, U.S. Pat. Nos. 3,841,654 and 5 3,970,329 both to Lewis, a vehicle seat system which comprises a seat belt having an inflatable section is shown. When a collision is detected, the inflatable section is inflated to protect the person wearing the seat belt.

The prior art inflatable seat belt structures, such as those identified above, generally use a unitary inflatable section made from a tightly woven material, such as 420 denier nylon, which is conventional air bag material. When deployed, the inflatable section will contract in length somewhat because the inflation pressure causes it to go from a flat, generally 2-dimensional shape to a 3-dimensional cylindrical shape. However, only the ends of the inflatable section contract as they fill and assume a hemispherical shape. This causes only the ends of the inflatable section to shorten, thus shortening the overall length of the inflatable section. The fibers of the material do not change their orientation: the two sets of fibers in the material remain roughly perpendicular to each other throughout the inflation process.

In the case of the typical inflatable seat belt made of conventional air bag material as described above, the maximum theoretical amount that the inflatable structure contracts upon inflation, in an unconstrained condition prior to being loaded by the occupant, is based only on the width of the flat material. If inflation results in a relatively small cylindrical diameter then a relatively small contraction, or shortening, of the length of the seat belt will occur. The calculation for determining the amount of contraction that will occur with conventional air bag material upon inflation and in an unconstrained condition is as follows:

$$Lf-Li=X \tag{1}$$

where:

X is the amount of contraction

Lf is the length of flat, uninflated, material

Li is the length of unconstrained inflated material, and $$Li=Lf-(Df-Di) \tag{2}$$

$$Di=2/\pi(Df) \tag{3}$$

$$Lf-Li=Df(1-2/\pi) \tag{4}$$

where:

Df is the width (flat diameter) of flat, uninflated, material

Di is the diameter of unconstrained inflated material.

As seen in equation (4), the length reduction depends solely on the uninflated width (flat diameter) of the material.

For example, an inflatable structure having a flat diameter of 20 cm and a flat length of 100 cm has a maximum achievable contraction of 7.3 cm or roughly 7% in the absence of any load. In an actual application, with the belt under tension, the contraction would be much less, e.g., about 3%. This degree of contraction would provide restraint that is only slightly greater, and, thus, only slightly more protective than a conventional seat belt.

The construction disclosed in U.S. Pat. No. 3,888,503 to Hamilton comprises an inflatable restraining band having a series of sections, some of which are inflatable to a greater degree than others interconnecting them. In the Hamilton design, contraction occurs upon inflation only at each end of each section, and because the sections are of variable inflatable size, the amount of contraction varies along the structure. By not allowing full expansion of interconnecting portions or sections of the inflatable band more hemispherical "ends" occur thus the overall band is foreshortened to a greater extent than otherwise on expansion, which causes greater tensioning of the band against the occupant restrained.

Hamilton provides greater protection than the conventional inflatable seat belt in terms of the provision of greater restraint and hence improves upon a conventional inflatable seat belt. However, the restraint that results from Hamilton's patent is still significantly less than the restraint provided by the present invention.

None of the patents described above provide the important advantage of the significant contraction which occurs in the present invention as the inflatable structure expands upon inflation.

SUMMARY OF THE INVENTION

The present invention is a seat restraint system having an inflatable structure in the torso section of the system, connected to a gas generator and crash sensor, that shortens greatly as it inflates. The invention is intended to replace conventional automotive seat belts. It can also be used in other types of vehicles and moving structures, such as trucks, vans, airplanes, railroad trains, elevators and helicopters.

The inflatable structure is a key component of the present invention. The inflatable structure must have the following characteristics: (1) it must contract in length substantially as it is inflated—the decrease in length of the inflated portion of the torso belt (measured when the torso belt is not under tension) must be at least 15%, and should preferably be 20% to 40%; (2) the area of the cross-section of the structure should increase substantially as the tube is inflated—the increase should be at least 50%, preferably 50% to 100%; (3) it must remain at a relative pressure sufficient to maintain a tensile force on the torso belt of 100 lbs (at ~1 g torso mass) for at least five seconds, and preferably at least 7 seconds; (4) the reduction in the length of the structure is the direct result of the inflation of the structure, which also results in an increase in the cross-sectional area of the structure. For example, an inflatable structure which is 91 cm long and has a diameter of 12 cm prior to inflation, reduces its length by about 28 cm and increases its diameter to 17 cm when the structure is inflated (not under tension).

In a first preferred embodiment of the present invention, the inflatable structure is a tubular structure that comprises a braided tube of continuous high-strength fibers (instead of the conventional material used for air bags). The fibers of the braided tube of the present invention form spirals and change their orientation upon inflation. Prior to inflation, the spirals are stretched-out longitudinally and the tubular restraint has a relatively small diameter, as shown in FIG. 2a. Subsequent to inflation, the spirals are closer together longitudinally and form a relatively large tubular diameter, as shown in FIG. 2b. That is, upon inflation, the braided tube significantly increases its diameter and significantly decreases its length. This contraction occurs because when the tube is inflated, the fibers seek an orientation that allows a lower resultant stress and hence a larger volume within the tube. In order to provide superior gas retention, braided tube preferably contains an inner bladder 222, as shown in FIG. 2c.

In the uninflated state, the braided tube in combination with the conventional seat belt assumes a flat woven belt configuration and acts as a conventional seat belt system and holds the occupant in the seat. However, as the braided tube inflates, the decreasing tube length acts as a pretensioning device first by drawing any slack out of the seat belt system and second by pre-loading the occupant. The shortened length of the braided tube helps greatly to further restrict subsequent occupant motion.

The inflated braided tube additionally provides a much larger restraint surface area for the occupant's body, which helps to distribute belt load forces. When the inflated braided tube is loaded by the occupant's body, it flattens slightly. This flattening increases the contact area between the body and the braided tube, thus further reducing the stress or load concentration on the occupant. In a side impact the inflated section provides occupant head protection.

The inflatable braided tube is connected to a gas generator which is in turn connected to a crash sensor. When the crash sensor detects an impact above a predetermined threshold, it sends a signal to the gas generator. The gas generator is ignited, and generating inflating gas that inflates the braided tube. The gas generator can be integrated within the seat back or base, in the buckle assembly of the belt, or in the trunk of the vehicle, for sound damping purposes and/or other practical considerations.

In a second preferred embodiment of the present invention, the inflatable structure comprises an extruded net. An extruded net is likely to be less expensive to manufacture than a braided tube. It can also be manufactured with a more open weave than the braided tube, which could result in greater contraction. FIGS. 4a and 4b are schematic diagrams of an extruded net structure before and after inflation, respectively. The dimensions of FIGS. 4a and 4b show how, as the extruded net is inflated, it contracts in length as it expands in diameter. The extruded net differs from the braid because the intersecting fibers are joined at the intersections. When the extruded net is inflated, the joints deform such that the longitudinal angle of intersection of the fibers increases dramatically, as shown in FIG. 4b. The minimum longitudinal angle prior to inflation is about 5°. Typically, the longitudinal angle prior to inflation is about 10°–15° and typically increases upon inflation to 90°–110°. The maximum longitudinal angle after inflation can be as high as 150°. This results in the desired inflatable structure, i.e., a structure which contracts substantially in length as it is inflated and the cross-section increases.

An alternative second preferred embodiment uses a modified extruded net, in which the intersections of the fibers are strengthened with nodes, as shown in FIGS. 5a and 5b. Typical materials that could be used to fabricate the modified extruded net include nylon and polyester fibers. The tensile strength of the net at the nodes should be equal to the tensile strength of the fibers.

A third preferred embodiment uses a woven net, as shown in FIGS. 6a and 6b. The woven net is similar to the extruded net, but the joints are woven together instead of being joined together. The joints are reoriented as the inflatable structure is expanded, as shown in FIG. 6b. Typical materials that could be used to fabricate the woven net include nylon, polyester and aramid fibers.

A fourth preferred embodiment, shown in FIG. 2d, uses a protective sheath 223 fabricated from woven fabric, e.g. nylon or polyester fabric, in addition to the braided tube and bladder. The sheath has the appearance and texture of a conventional seat belt.

The present invention may be implemented in the rear seat of an automobile by routing the inflatable section of the torso belt through a constraint at the top of the rear seat and down the back of the rear seat, essentially similar to the front seat installation shown in FIGS. 1a–1e. However, in an alternative embodiment of the present invention, the gas generator is installed behind the rear seat, as, for example, shown in FIG. 7a, and the inflatable section of the torso belt extends across the rear shelf of the vehicle towards the trunk. In the alternative embodiment shown in FIGS. 7a–7b, the inflatable section of the torso belt is shown as connected to a hose which is connected to a rigid pipe. The rigid pipe is connected to a gas generator, such that the pipe can rotate around the gas generator, without blocking in any way the fluid connection from the gas generator to the rigid pipe, or from the rigid pipe to the hose. The rigid pipe is biased towards the horizontal position.

FIGS. 8a–8c show an embodiment of the present invention for rear seat installation that is similar to that of FIGS. 7a–7b, but uses a hose retractor instead of a rigid pipe. In this embodiment, 800 is flexible, and tension is kept on the inflatable structure through the use of torsion 801 and rollers 802.

FIG. 9 is a schematic diagram of another embodiment of the present invention, for rear seat installation. This embodiment is similar to the embodiment shown in FIGS. 1a–1e, but uses the space between the seat back and the front trunk wall. The hose is bent into a U shape or J shape, as shown in FIG. 9, and held in place by a channel.

FIG. 10 is yet another embodiment of the present invention in which the inflatable torso belt is top-filled via a torso belt upper anchor arm that is pivotally mounted to the side of a seat back. In a preferred implementation of this particular embodiment, the anchor arm replaces a torso belt retractor and an associated D-ring, and functions as a torso belt height adjuster.

The primary object of the present invention is to prevent or reduce the severity of primary and secondary injuries suffered by a vehicle occupant in the event of a crash, by pretensioning the restraint system, further restricting the motion of the occupant's body, by distributing the restraint forces over a larger surface area, and to provide side impact head protection.

Eight crash tests simulating four equivalent frontal and four equivalent side impacts were conducted to compare the restraining capability of the present invention to a conventional three-point seat belt, and to two prior art air belt systems. The first air belt was inflated to a relative peak inflation pressure of approximately 1 bar, and the second air belt was inflated to a relative peak inflation pressure of approximately 3 bars. The results of these tests are listed in Table 1. As shown by Table 1, the first air belt shows essentially no improvement over the conventional three-point seat belt. The second air belt shows some improvement compared to a conventional three-point seat belt, i.e., head displacement was reduced by six inches in the forward crash simulation and by 2.5 inches in the side impact simulation. Head rotation, a possible indicator of neck injuries, was also reduced. However, the restraint system manufactured according to the present invention, inflated to a peak inflated pressure of approximately 2 bars, produced the greatest improvements in occupant kinematics: head displacement was reduced by 15.5 inches (from 20.5 inches to 5.0 inches) in the forward direction) and by 8 inches (from 23 inches to 15 inches) in the lateral direction. The superior performance of the present invention is due to its ability to reduce its overall length to a greater extent than prior art restraints.

Accordingly, it is an object of the present invention to provide a protective seat belt system that inflates on impact to protect the occupant of a vehicle.

It is another object of the present invention to provide a protective apparatus that restricts occupant motion during a crash.

It is another object of the present invention to provide an inflatable braided tube member that can greatly shorten (by 20% to 40%) as it inflates to remove slack and pretension the restraint system.

It is another object of the present invention to provide an inflatable braided tube that distributes crash loads over larger occupant surface area, thus minimizing pain and potential injury.

It is another object of the present invention to provide an inflatable braided tube that is not subject to roping, roll-out or seam splitting problems.

It is another objective of the present invention to provide an inflatable braided tube that protects the head in side impacts.

It is another object of the present invention to provide a top-filled inflatable tube.

It is another object of the present invention to provide a top-filled inflatable tube which does not require a flexible fill hose which might need to continuously flex, bend or stroke during normal belt use.

It is another object of the present invention to provide a rotatable upper anchor arm for a top-filled inflatable tube that operates as a height adjustable upper anchor point for an inflatable torso belt.

These and other objects of the present invention are described in greater detail in the detailed description and the appended drawings.

DETAILED DESCRIPTION OF PREFERRED EMBODIMENTS OF THE INVENTION

A preferred embodiment of the invention is shown in the uninflated and inflated configurations in FIGS. 1a through 1e installed with respect to a typical driver-side automobile seat 121. A mirror image of the invention would function equally as well on a passenger-side automobile seat.

Figure 1A:
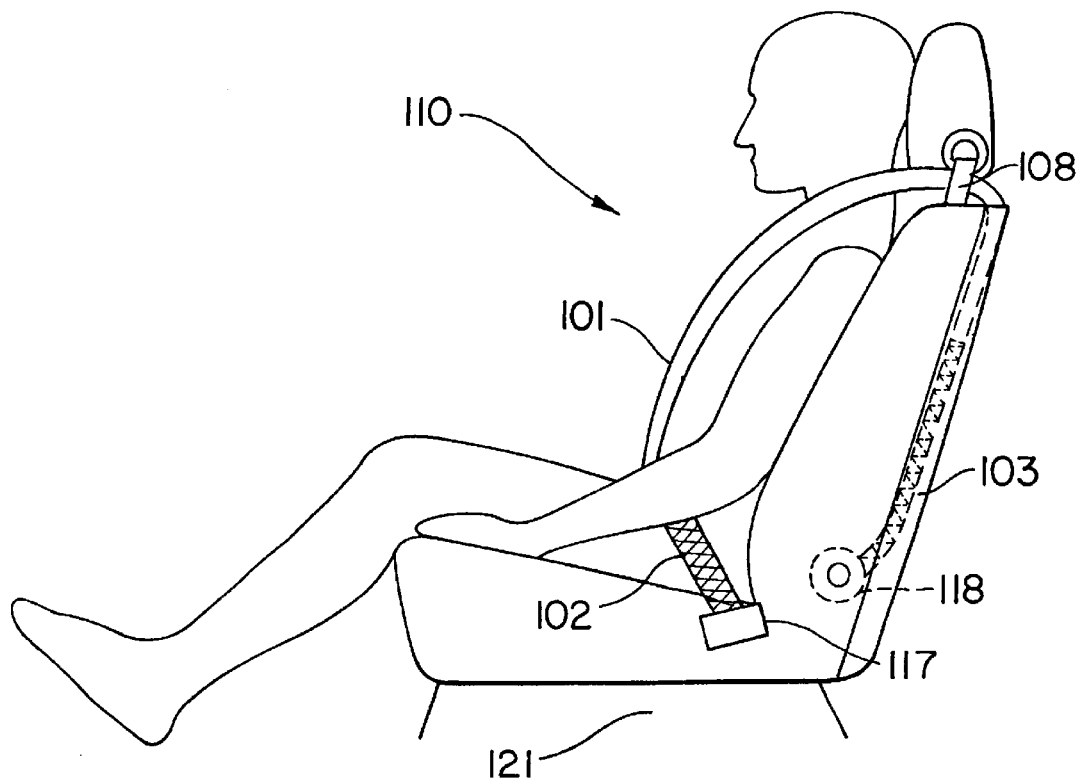
FIG. 1a is a schematic diagram of a side view of the present invention in the uninflated configuration.
Figure 1B:
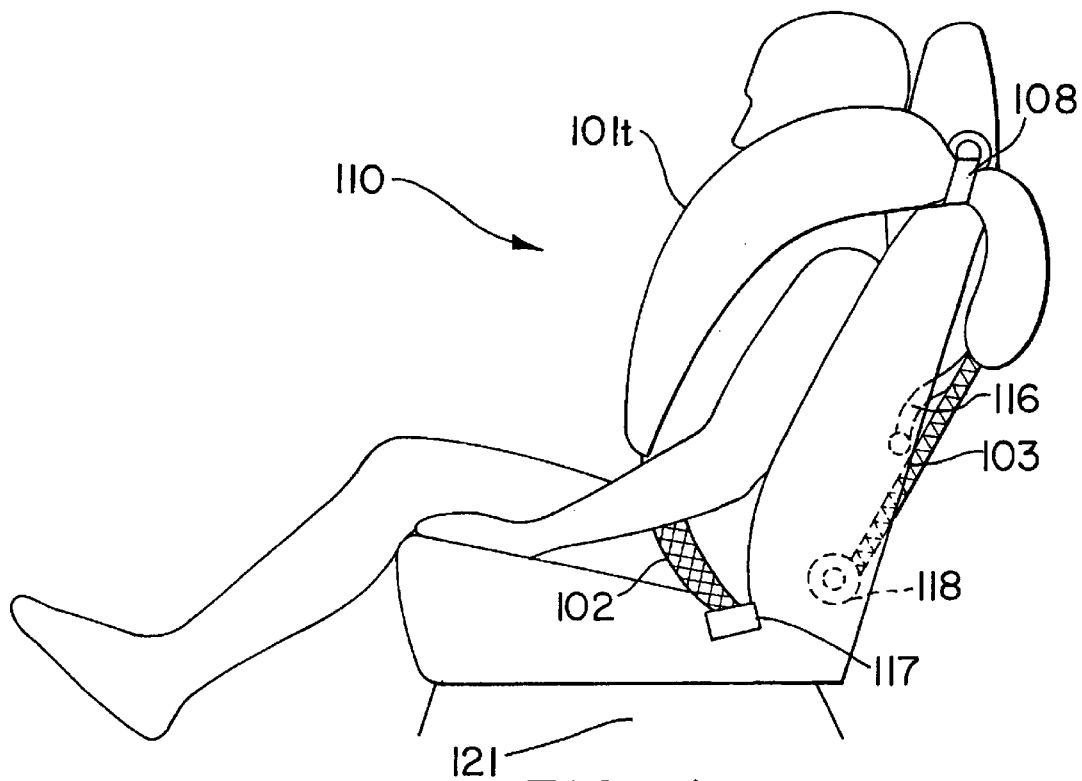
FIG. 1b is a schematic diagram of a side view of the present invention in the inflated configuration.
Figure 1C:
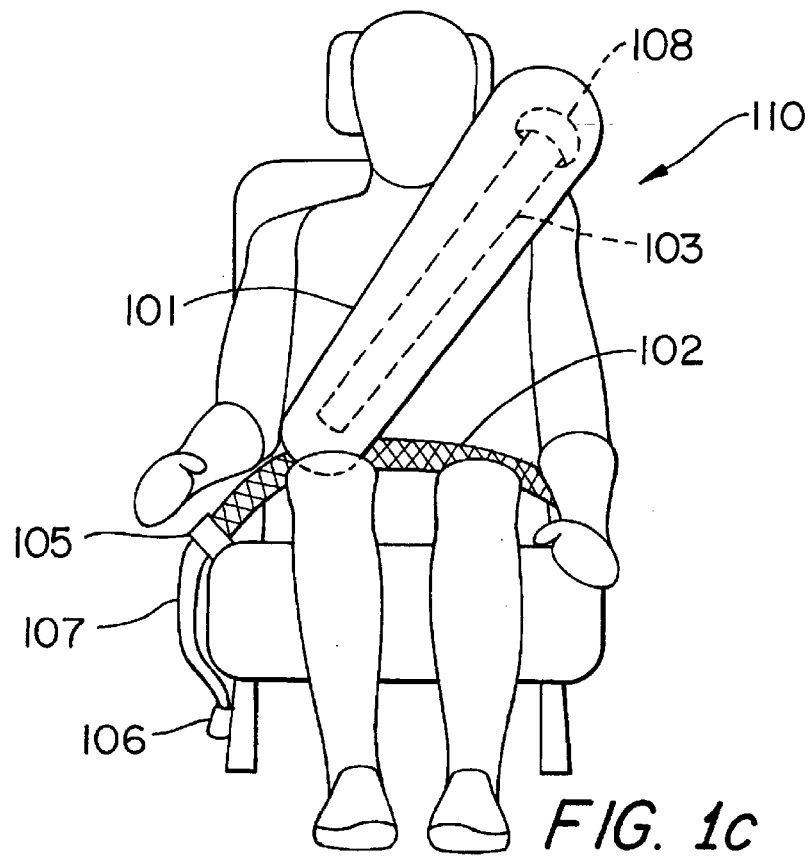
FIG. 1c is a schematic diagram of a front view of the present invention in the inflated configuration installed with respect to the driver-side seat of a typical automobile.

As shown in the FIGS. 1a–1e, the seat belt system 110 of the first preferred embodiment comprises lap belt 102, shoulder or torso belt 103, including an inflatable section 101 comprising a torso portion 101t, buckle assembly 105, anchor 106, anchored inertial reels 117 and 118, gas generator 122, and sensor assembly (not shown). As shown in FIG. 1c, lap belt 102 and torso belt 103 form one continuous strap which is attached to or passes through the male portion of buckle assembly 105. Lap belt 102 is designed to restrict the forward motion of a seated occupant at the pelvis. The lap belt 102 is connected to anchored inertial reel 117 so that the length of the lap belt 102 can be adjusted to accommodate a wide range of seated occupants. Inertial reel 117 pivotally mounts lap belt 102 to the floor or seat structure on the door-side of seat 121 (as shown in FIGS. 1a and 1b). The other end of lap belt 102 ends at the male portion (the tongue) of buckle assembly 105. The male portion (the tongue) may or may not be fixed to the belt (i.e., the tongue is either a fixed tongue or a sliding tongue, depending on the particular locating requirements of the inflatable section which is dependent on the specific application). The female portion of buckle assembly 105 is attached to buckle strap 107. Buckle strap 107 is pivotally mounted to an attachment point in the vehicle, such as the base of seat 121, or a floor structure on the side of seat 121 that is furthest from the door, by anchor 106. The female and male portions of buckle assembly 105 fasten together, thus securing seat belt system 110 around the occupant in a manner similar to that used by conventional three point seat belt systems.

Figure 1D:
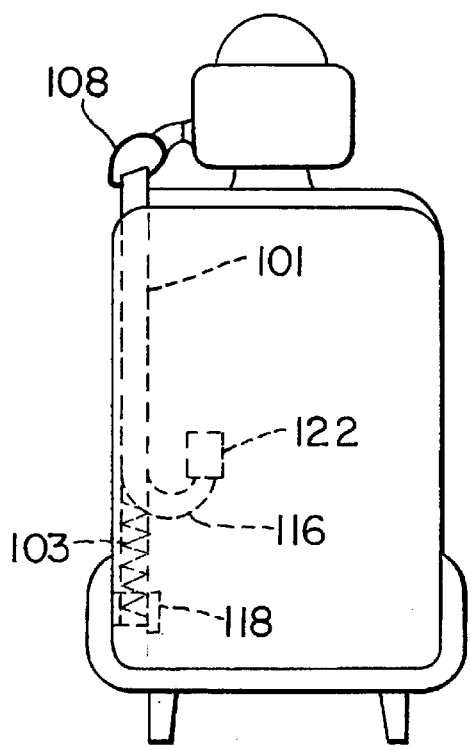
FIG. 1d is a schematic diagram of cut-away rear view of the present invention in the uninflated configuration installed with respect to the driver-side seat of a typical automobile.
Figure 1E:
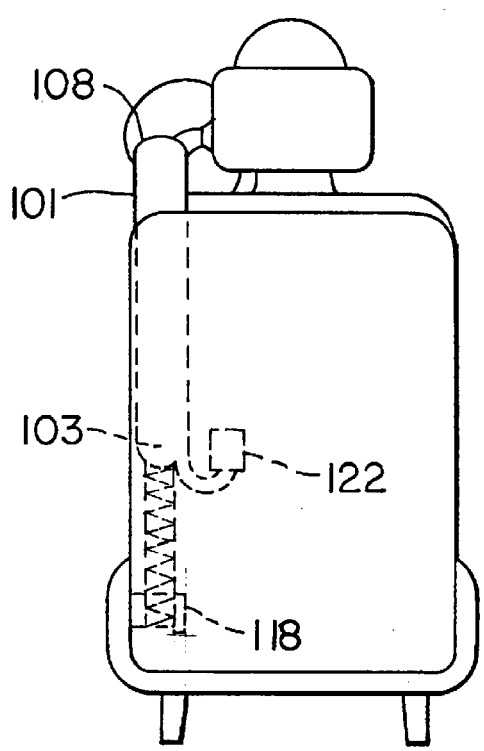
FIG. 1e is a schematic diagram of a cut-away rear view of the present invention in the inflated configuration installed with respect to the driver side seat of a typical automobile.

As shown in FIG. 1d gas generator 122 is preferably mounted inside the seat back to protect it from impacts and to dampen the noise it produces when activated. The gas generator could also be located in the seat base (not shown). Durable tubing 116 provides a fluid path from gas generator 122 to inflatable braided tube 101.

As shown in FIG. 1a, inflatable section 101 extends diagonally from the occupant's hip to behind and above the occupant's shoulder and is attached at each end to torso belt 103. The upper end of inflatable section 101 loops through a D-ring 108 that is mounted to the seat 121 as shown or to the vehicle (e.g., at the roof rail or at the upper B-pillar area (not shown)). The torso belt 103 then is anchored to the seat 121 or vehicle (not shown) by an inertial retractor 118. As shown in FIG. 1a, torso strap 103 is preferably routed inside the vehicle seat to inertial retractor 118, which is mounted in the lower portion of the seat back. As discussed below with reference to FIG. 1d, gas generator 122 is preferably mounted inside the vehicle seat. Thus, in the configuration shown in FIGS. 1a and 1d, tubing 116 provides direct fluid communication from the gas generator to inflatable section 101 in the torso of the restraint system. Torso strap 103, buckle strap 107, and lap belt 102 are formed from conventional webbing material such as nylon, dacron, or polyester. Alternatively strap 107 could be a steel cable.

The key component of the safety belt system 110 is the inflatable structure 101. In the embodiment illustrated in FIGS. 1a–1e, the inflatable structure is a braided tube 101 that is integrated in the torso belt 103. The braided tube 101 is similar to the braided tubes disclosed in U.S. Pat. Nos. 5,322,322 and 5,480,181, which are incorporated by reference herein.

Figure 1F:
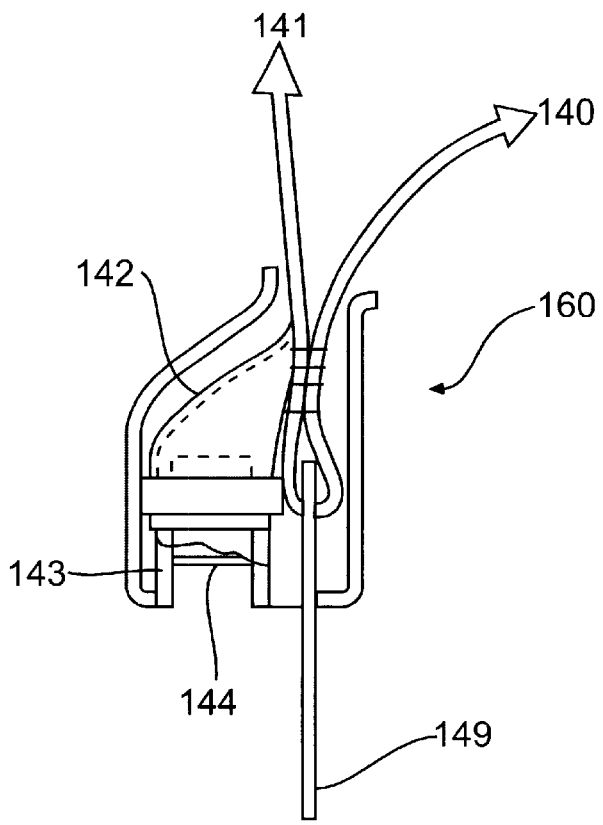
FIGS. 1f and 1g are schematic diagrams of the latch assembly and the buckle assembly, respectively, showing how the gas generator can be mounted in the buckle assembly.
Figure 1G:
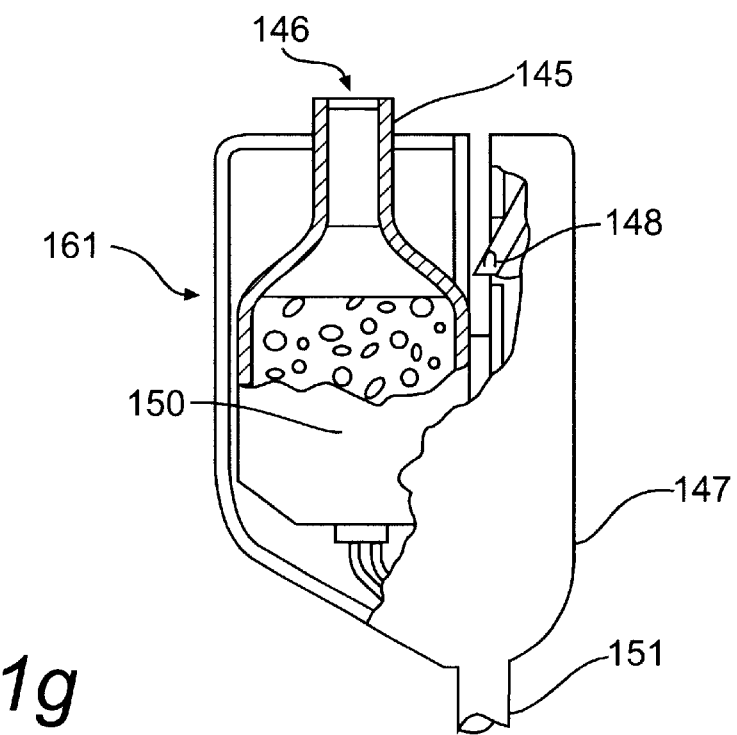
Figure 1H:
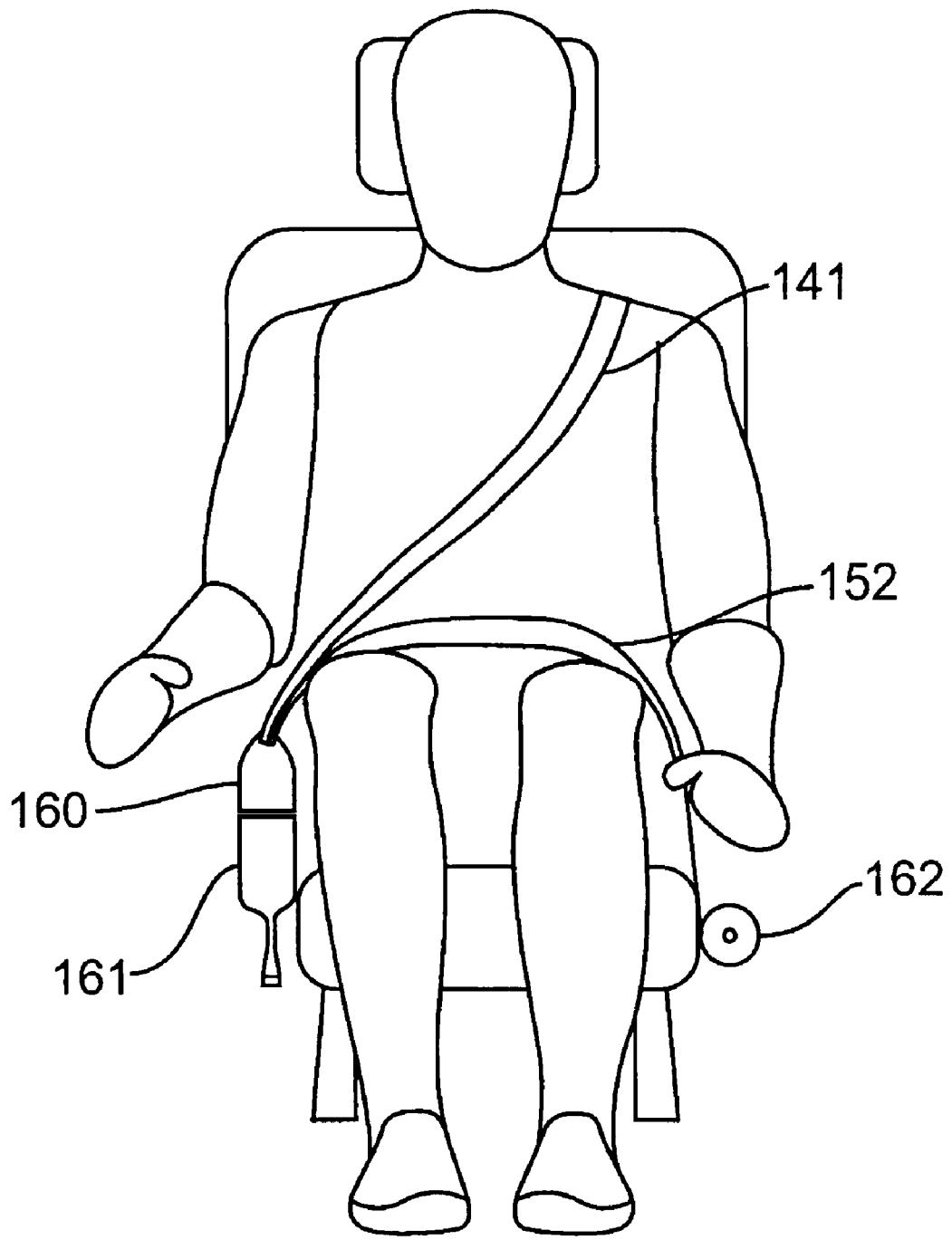
FIG. 1h is an overall schematic diagram showing how the latch and buckle assemblies of FIGS. 1f and 1g, respectively, are used with the torso and lap belts.

FIGS. 1f and 1g are schematic diagrams of the latch assembly and the buckle assembly used with an alternative placement for the gas generator. The generator is placed in the buckle assembly of the torso belt. FIG. 1f is a schematic diagram of the latch assembly of the seat belt, showing lap belt 140, torso belt 141 (which contains the inflatable structure), fill hose 142 and female fill tube 143. A frangible seal 144 at the entrance to the fill tube protects the inflatable structure from contamination. The entrance to female fill tube 143 on the latch assembly in FIG. 1f mates with male fill tube 145 in the buckle assembly shown in FIG. 1g. Fill tube 145 is protected from contamination by frangible seal 146. If the gas generator is ignited, the pressure of the inflating gas bursts frangible seals 144 and 146, allowing gas to flow from gas generator 150 through the buckle and latch assembly to the inflatable structure in torso belt 141. Engaging the latch assembly with the buckle assembly seals fill tubes 143 and 145. Lock tang 149 (at the end of the latch assembly) engages lock dog 148 (in the buck assembly) in the same manner as conventional seat belt latch and buckle assemblies, so that the latch assembly locks to the buckle assembly. FIG. 1h is an overall schematic diagram of this embodiment showing torso belt 141, lap belt 152, latch assembly 160, buckle assembly 161 and lap belt retractor 162.

Braided tube 101 is shown in detail in FIGS. 2a–2d. Braided tube 101 is comprised of a braided tube of continuous high-strength fibers. Typical fiber materials include aramid, nylon, dacron, polyamide and polyester fibers. Braided tube 101 is made of continuous fibers that may or may not be impregnated with elastomeric material, such as silicone rubber or urethane. Unlike the conventional fibers employed in prior art for making air bags, the fibers of this invention form spirals and change their orientation (included longitudinal angles) upon inflation. Prior to inflation, the spirals are stretched-out longitudinally and the tubular restraint has a relatively small diameter. Subsequent to inflation, the spirals are closer together longitudinally and form a relatively large tubular diameter. That is, upon inflation, the entire braided tube increases its diameter and decreases its length, or contracts. This contraction occurs because as the tube is inflated, the fibers seek an orientation that allows a larger volume within the tube.

Figure 2A:
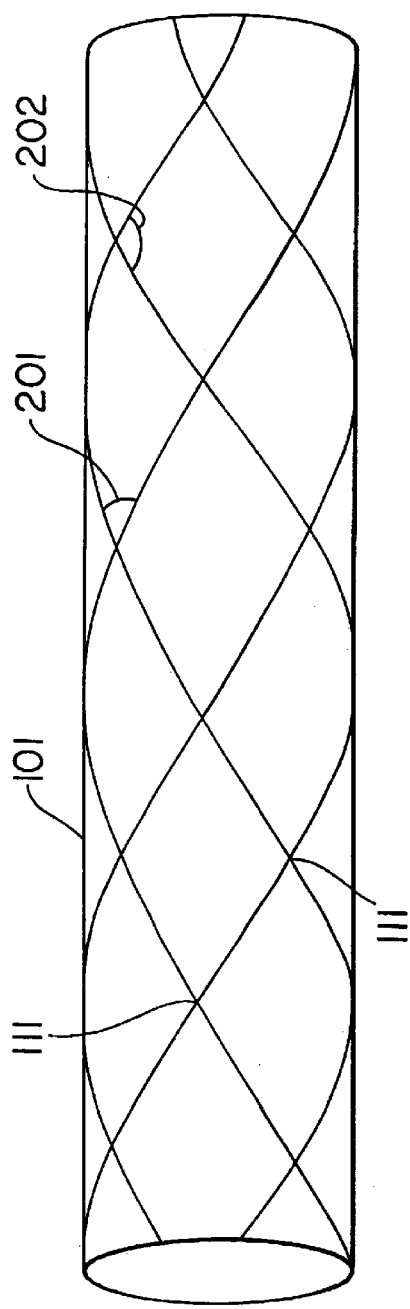
FIG. 2a is a schematic diagram of the braided tube of the present invention in the uninflated state.

As shown in FIG. 2a, angle 201 is a longitudinal angle and angle 202 is a circumferential angle. In the uninflated state, shown in FIG. 2a, braided tube 101 is elongated with its woven fibers forming obtuse and acute angles at the fiber crossing points 111. For the sake of convenience and clarity, the angles which are acute in FIG. 2a (which would be bisected by a line parallel to the longitudinal axis of the braided tube) will be termed the longitudinal angles. The angles which are obtuse in FIG. 2a (which would be bisected by a line parallel to the circumference of the braided tube) will be termed the circumferential angles.

When the braided tube is in the uninflated state, its fibers are at a longitudinal angle in the range of about 300 to about 70°. In every case, upon inflation, the fibers will seek a preferred maximum longitudinal angle of about 110° when the tube is in an unconstrained state. Typically, the angle after inflation is approximately 100° in an unloaded, or unconstrained, braided tube. Given the range of angles from about 30° to about 70° in an uninflated tube and an angle of about 100° in an unloaded inflated tube, the range of typical length decrease, or contraction, of the inflatable tube is about 21.5% (for the 70° to 100° change) to about 33.5% (for the 300 to 100° change). The percentage of contraction is not a function of the initial diameter or length of the inflatable tube.

The calculation for determining the amount of contraction that will occur with the present invention upon inflation and in an unconstrained condition is as follows:

$$Lf-Li=X \tag{5}$$

where:

X is the amount of contraction

Lf is the length of flat, uninflated, material, and

Li is the length of unconstrained inflated material and $$Li/Lf=\cos(\theta i/2)/\cos(\theta f/2) \tag{6}$$

$$Lf-Li=Lf(1-\cos(\theta i/2)/\cos(\theta f/2)) \tag{7}$$

where:

θf is the longitudinal angle prior to inflation

θi is the longitudinal angle after inflation.

Merely by way of example, an embodiment of the present invention having an uninflatable flat length of 100 cm and a flat diameter of 20 cm and constructed with fibers that cross each other at a 36° angle would decrease in length, or contract, to 67 cm or by approximately 33% upon inflation in an unconstrained condition. (The calculation assumes that the angle of the fibers in an unconstrained inflated braided tube will be 100°.)

As stated above, the invention contracts as a result of both inflation and construction. Therefore, it will typically contract about 21.5% to about 33.5% as a to result of the change in orientation of the fibers (construction) plus an additional percent (Lf–Li=Df(1–2/π)) as a result of the geometrical change from a flat belt to a cylindrical belt with hemispherical ends. Thus the braid contraction is in addition to—not instead of—the retraction in a conventional seat belt.

The fibers in the braided tube form clockwise and counterclockwise spirals both prior to inflation and subsequent to inflation. Prior to inflation, the spirals are stretched-out longitudinally, and have a relatively small diameter. Subsequent to inflation, the spirals are closer together longitudinally, and have a relatively large diameter. This occurs because, as the tube is inflated, the tube fibers seek an orientation that allows a larger volume within the tube, and results in lower resultant stress, with fibers aligned to roughly parallel to the orientation of the resultant stress.

Figure 2B:
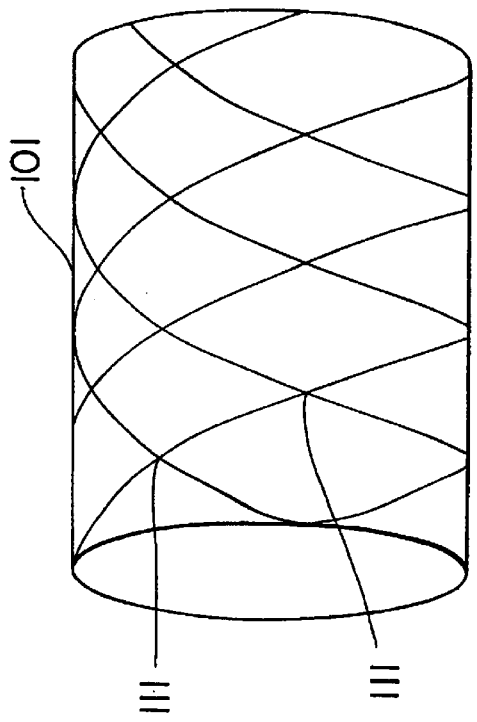
FIG. 2b is a schematic diagram of the braided tube of the present invention in the inflated state.
Figure 2C:
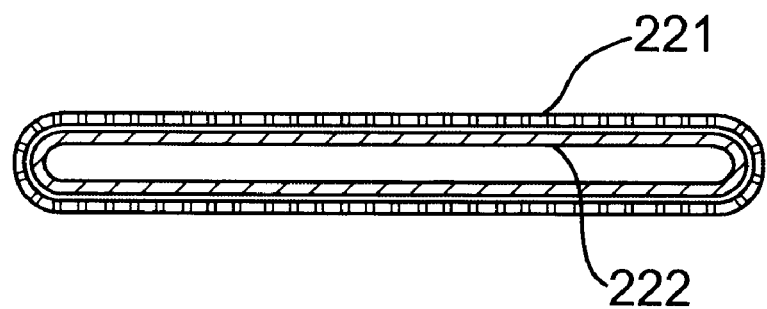
FIG. 2c is a schematic diagram of a braided tube having an inner bladder.
Figure 2D:
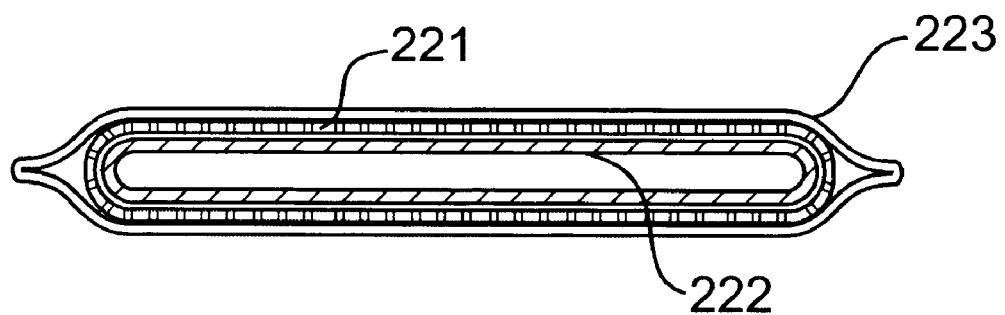
FIG. 2d is a schematic diagram of a braided tube having an inner bladder and a protective sheath.

FIG. 2b shows that as it inflates, braided tube 101 shortens in length, while its diameter increases. The braid fibers ultimately seek an orientation in which the longitudinal angles increase substantially as the tube diameter increases. As the tube diameter increases, the tube length decreases. If the tube were unconstrained and the longitudinal angles of the tube were in the range of about 30° to about 70°, the typical range for unconstrained decrease of the tube length is about 20% to about 39%, preferably about 21.5% to about 33.5%, and most preferably about 33.5%.

The fibers in the uninflated braided tube typically have a longitudinal angle in the range of about 30° to about 70°. Upon inflation the longitudinal angle between the fibers will reach approximately 100°. The preferred maximum longitudinal inflation angle of the fibers is approximately 110°.

FIG. 1a shows seat belt system 110 of the present invention in the uninflated state in which braided tube 101 assumes a flat woven belt configuration and the system acts as part of a conventional 3-point restraint. The uninflated braided tube in combination with the conventional webbing forms a high-strength belt that has the same width (approximately 2 inches) as the conventional webbing material of lap belt 102 and torso belt 103.

As best shown in FIG. 1d, when a collision occurs, the crash sensor sends a signal to the initiator in gas generator 122. The initiator then ignites the gas generator 122, thus producing a gas that passes through durable tubing 116 and inflates braided tube 101. As gas flows into the chamber of braided tube 101, the internal pressure causes the tube diameter to increase and the tube length to decrease. However, the seat belt system 110 is constrained on the outboard side by the first inertial reel 117 and on the inboard side by anchor 106, and behind the shoulder by the second (shoulder or torso belt) inertial reel 118. Inertial reels 117 and 118 lock up during impact, preventing payout of the belt. Thus as braided tube 101 contracts, it pulls any slack out of seat belt system 110. The occupant is thus provided with a pretensioned seat belt, which restricts the forward motion of the occupant and reduces primary injuries.

Further, the male portion of the buckle assembly 106 can be located on the lap belt 102 using rip-stitching or a locating snap or button. When a collision occurs and upon inflation, the locating attachment between lap belt 102 and buckle 105 releases, allowing the lap portion to pull tight, thereby further restricting the motion of the occupant and preventing the occupant from sliding under the lap belt (i.e., submarining).

Braided tube 101 is not stowed under any belt member, but is instead stowed on the outside of the torso belt. This positioning allows the tube to inflate evenly without experiencing roll-out problems. Seam splitting problems common to inflating bladders are also avoided because braided tube 101 is a seamless structure.

When fully inflated, braided tube 101 has a diameter of approximately 12 to 18 cm and a relative internal pressure of approximately 1 to 4 bars (2 to 5 bars absolute pressure). Due to increased friction, as the area of contact of inflated braided tube 101 with the occupant increases, inflated braided tube 101 helps to further restrict occupant motion. Unlike conventional 3-point seat belt systems, the present invention additionally helps lessen or prevent secondary belt-inflicted injuries by providing a substantially larger restraint surface area for the occupant's body, which helps to distribute belt load forces.

Additionally, the present invention provides side impact crash protection from head injury by restricting head movement, preventing the occupant's head from striking the window, the side of the vehicle, or any intruding objects.

Figures 1, 3A:
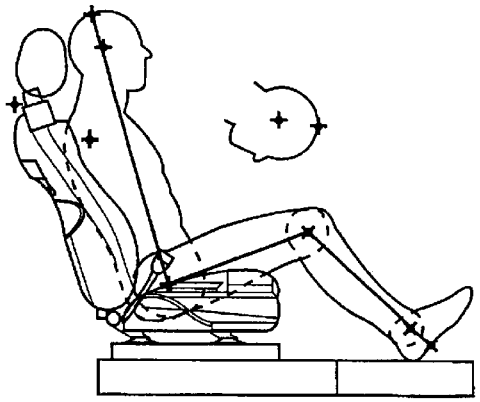
FIG. 3a is a schematic diagram showing the relative distance of the head displacement and the degree of head rotation during equivalent simulated forward-impact crash tests in which a conventional seat belt, a first air belt inflated to a relative pressure of 1 bar, a second air belt inflated to a relative pressure of 3 bars, and the present invention during the tests summarized in Table 1.
Figures 2, 3A:
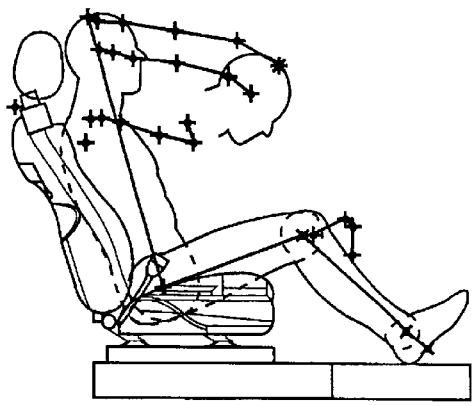
Figures 3, 3A:
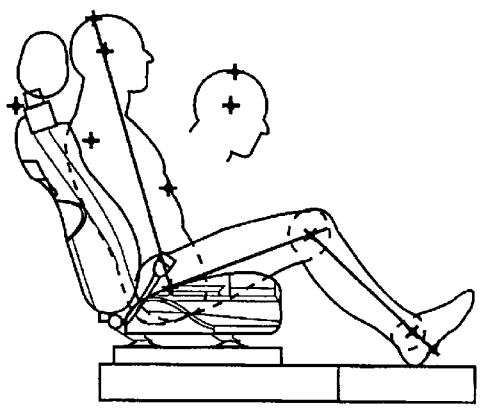
Figures 3, 3A, 4:
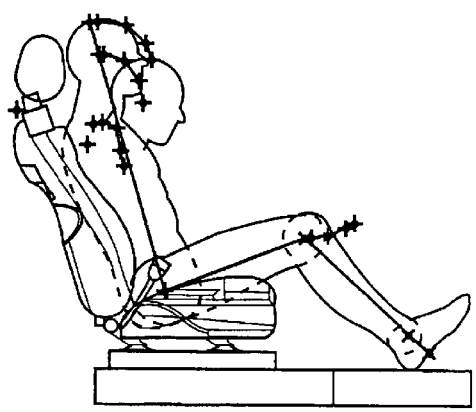
Figures 1, 3B:
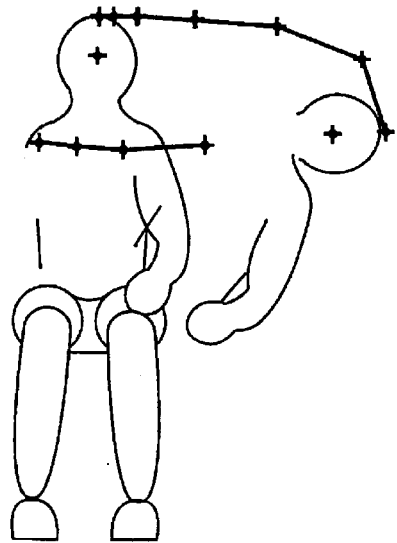
FIG. 3b is a schematic diagram showing the relative distance of the head displacement and the degree of head d rotation during equivalent simulated side-impact crash tests in which a conventional seat belt, a first air belt inflated to a relative pressure of 1 bar, a second air belt inflated to a relative pressure of 3 bars, and the present invention during the tests summarized in Table 1.
Figures 2, 3B:
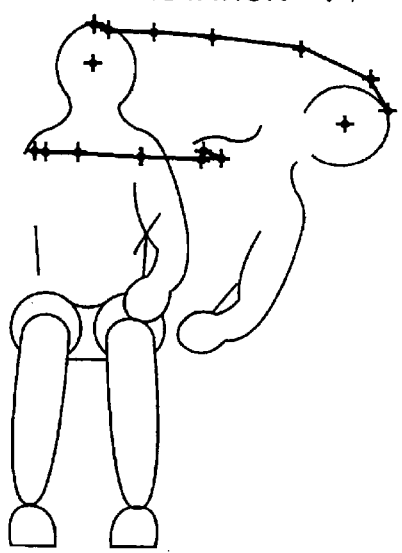
Figures 3, 3B:
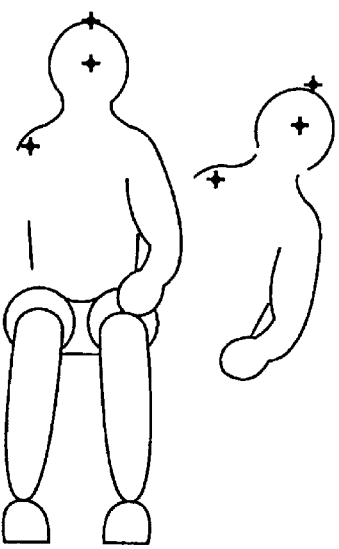
Figures 3, 3B, 4:
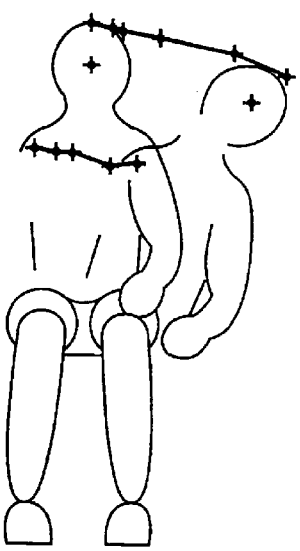

FIGS. 3a and 3b illustrate the results of simulated crash tests. These figures demonstrate that the present invention is more effective in limiting forward and side head displacement in frontal and side impacts, respectively, than are conventional prior art three-point seat belts and air belts fabricated from conventional materials.

The crash tests also demonstrated an important feature of the present invention: the belt continues to contract and further restrains the occupant after the initial loading. The sequence is as follows:

(1) An impact occurs, causing the vehicle to decelerate suddenly;

(2) The crash sensor detects the impact, and initiates inflation of the inflatable portion of the torso belt;

(3) The occupant continues to move forward (relative to the vehicle) against the torso belt;

(4) The inflatable portion of the torso belt inflates, pretensioning the torso belt, distributing the stresses over a wider area, and preventing the occupant from hitting the windshield;

(5) The occupant reaches his/her maximum forward position—at this point, the occupant is exerting considerable force on the torso belt, which puts the torso belt under an additional tensile force, which in turn prevents the inflatable portion of the torso belt from reaching its maximum contraction;

(6) The occupant then rebounds back towards the seat back, relieving the additional tensile force from the torso belt, allowing the inflatable portion to contract further in length while its diameter expands, effectively performing a second pretensioning function;

(7) The additional contraction in length keeps the occupant firmly in the seat during secondary collisions or rollovers, and prevents the occupant from sustaining further injuries.

Thus the present invention functions quite differently from other restraint systems, because (unlike a conventional belt pretensioner) the torso belt continually tries to contract after the initial loading (of the occupant on the restraint system).

Figure 4A:
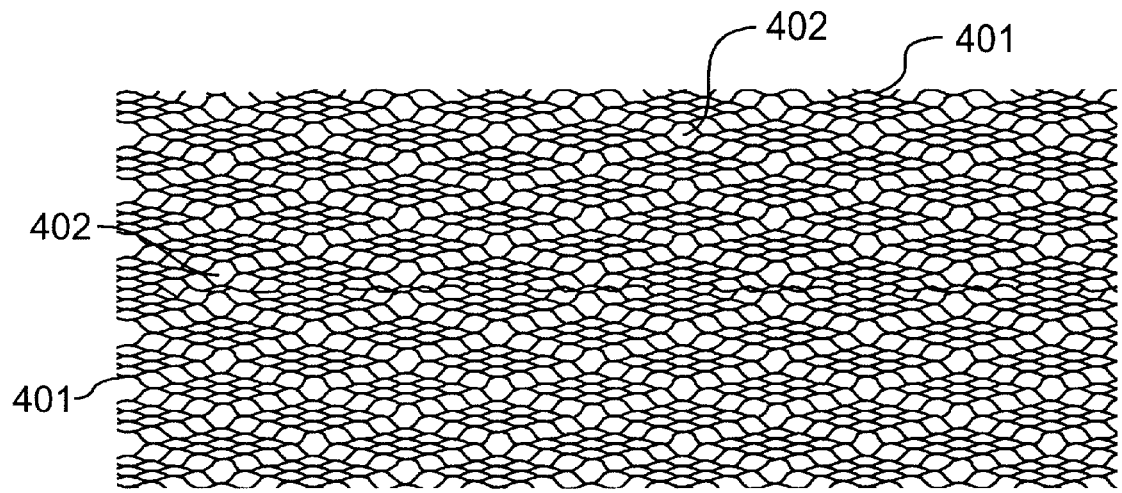
FIG. 4a is a schematic diagram of an extruded net tubular structure, prior to inflation.
Figure 4B:
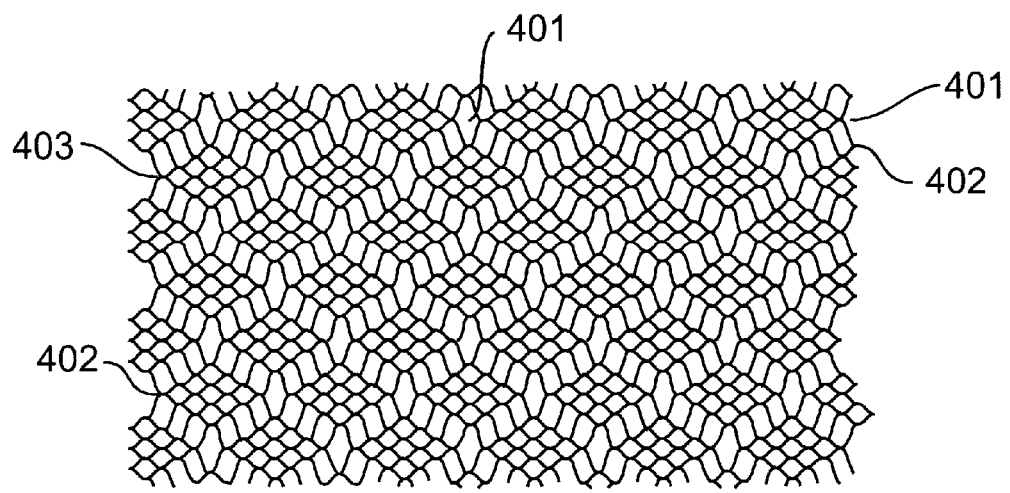
FIG. 4b is a schematic diagram of an extruded net tubular structure, after inflation.

In the second preferred embodiment of the present invention, an extruded net formed in a tubular shape is used as the inflatable structure (instead of the braided tube). FIGS. 4a and 4b show the extruded net, prior to inflation (FIG. 4a) and subsequent to inflation (FIG. 4b). FIGS. 4a and 4b show how the extruded net contracts in length as it is inflated and expands in diameter. FIGS. 4a and 4b also show that the intersecting members 401 form flexible joints 402 at the intersections of the members, which deform as the tube is inflated and expands. The longitudinal angle of intersection 403 of the fibers increases dramatically, as shown in FIG. 4b which, just as in the braided tube, causes the tube to contract substantially in length as its diameter increases. Materials that could be used to fabricate the extruded net include nylon and polyester.

Figure 5A:
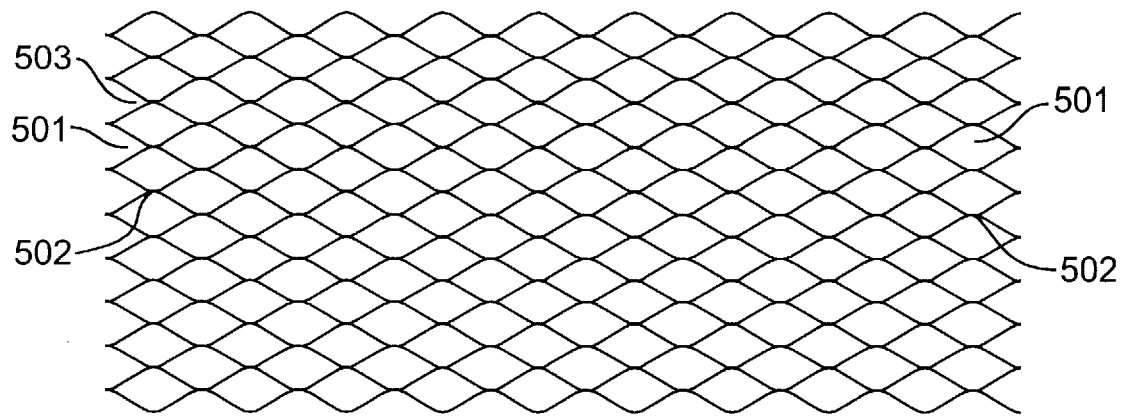
FIG. 5a is a schematic diagram of a modified extruded net tubular structure, prior to inflation.
Figure 5B:
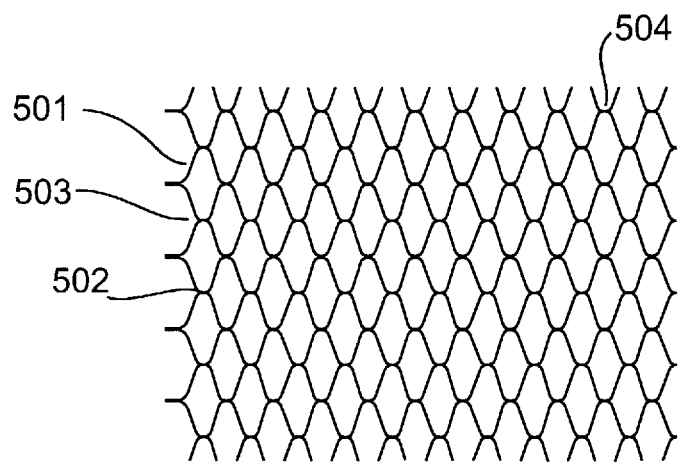
FIG. 5b is a schematic diagram of a modified extruded net tubular structure, after inflation.

An alternative second preferred embodiment of the present invention uses a modified extruded net, in which the intersections of the fibers are strengthened with nodes, as shown in FIGS. 5a and 5b. Like the extruded net shown in FIGS. 4a and 4b, this embodiment uses members 501 which are joined at intersections 502. When the tube is inflated, the longitudinal angle 503 of the intersecting members increases dramatically. Unlike the extruded net of FIGS. 4a and 4b, the intersections 502 include nodes 504 which serve to strengthen the net. Typical materials that could be used to fabricate the modified extruded net include nylon and polyester fibers. Extruded Net can be obtained from Pacon, Inc., City of Baldwin Park, Calif. 91706, or from Polynet, Inc., P.O. Box 27, Three Rivers, Mass. 01080.

Figure 6A:
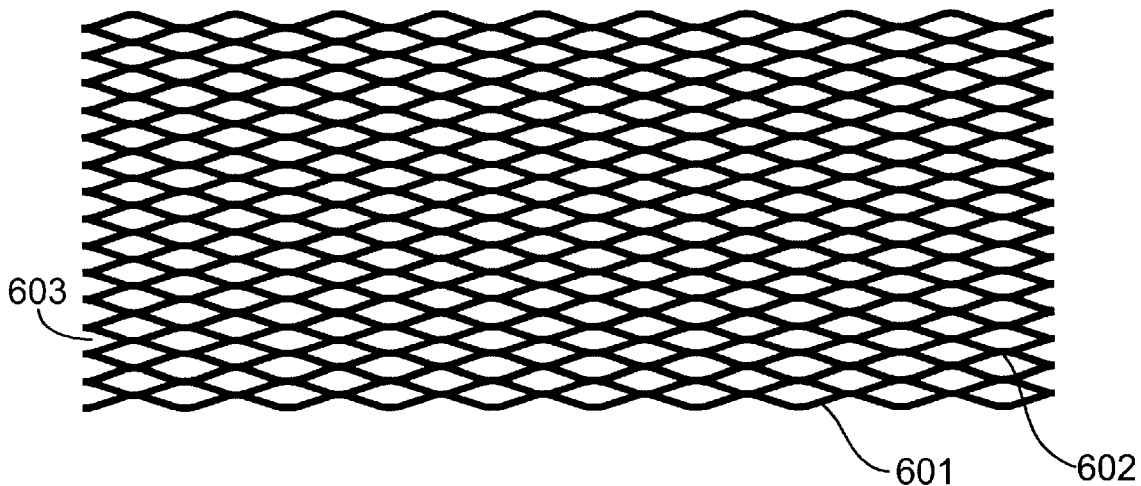
FIG. 6a is a schematic diagram of a woven net tubular structure, prior to inflation.
Figure 6B:
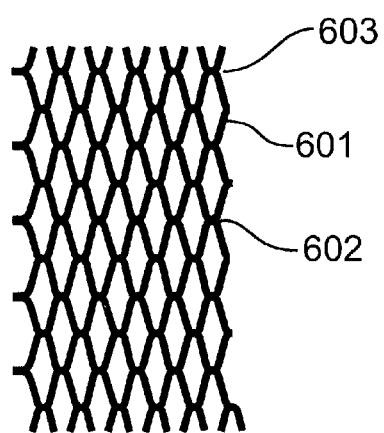
FIG. 6b is a schematic diagram of a woven net tubular structure, after inflation.

A third preferred embodiment used a woven net, as shown in FIGS. 6a and 6b. FIGS. 6a and 6b show fibers 601 woven in a net comprising intersections 602. The woven net is similar to the extruded net, but the joints are woven together instead of being joined together. As the tube is expanded, the joints are reoriented and the longitudinal angle 603 increases, as shown in FIG. 6b. Typical materials that could be used to fabricate the woven net include nylon, polyester and aramid fibers.

The gas generator 122 used in the invention is preferably similar to those currently used in automotive side-impact as opposed to frontal air bags. This is due to the relatively smaller volume and faster filling requirements of side-impact air bags as opposed to frontal air bags. Gas generators preferred for this invention must inflate braided tube 101 to a relative pressure of approximately 1.5 bars (2.5 bars absolute) within 10 to 15 milliseconds.

The present invention could be installed for the protection of passengers sitting in the rear seat of an automobile using the same installation as for front seat occupants (e.g., a driver and a passenger), i.e., by routing the inflatable portion of the torso section over the top of the back of the seat. However, the inflatable portion could also be routed through a constraint at the top of the back of the rear seat, over the rear shelf of the vehicle, and into the trunk, as shown in FIGS. 7a–7b, 8a–8c and 9. The retractor winds up the belt when no one is using the restraint system, and pays out the torso belt to accommodate an occupant. The retractor uses an inertial reel, i.e., a reel that locks up in the event of a frontal impact. In the embodiment shown in FIGS. 7a–7b, the inflatable section of the torso belt is connected to a hose, which in turn is attached to a rigid pipe. The rigid pipe is rotatably attached to the gas generator, such that when the gas generator is ignited and generates inflating gas, the inflating gas goes into the rigid pipe, through the hose and into the inflatable section of the torso belt, inflating the inflatable section of the torso belt.

Figure 7A:
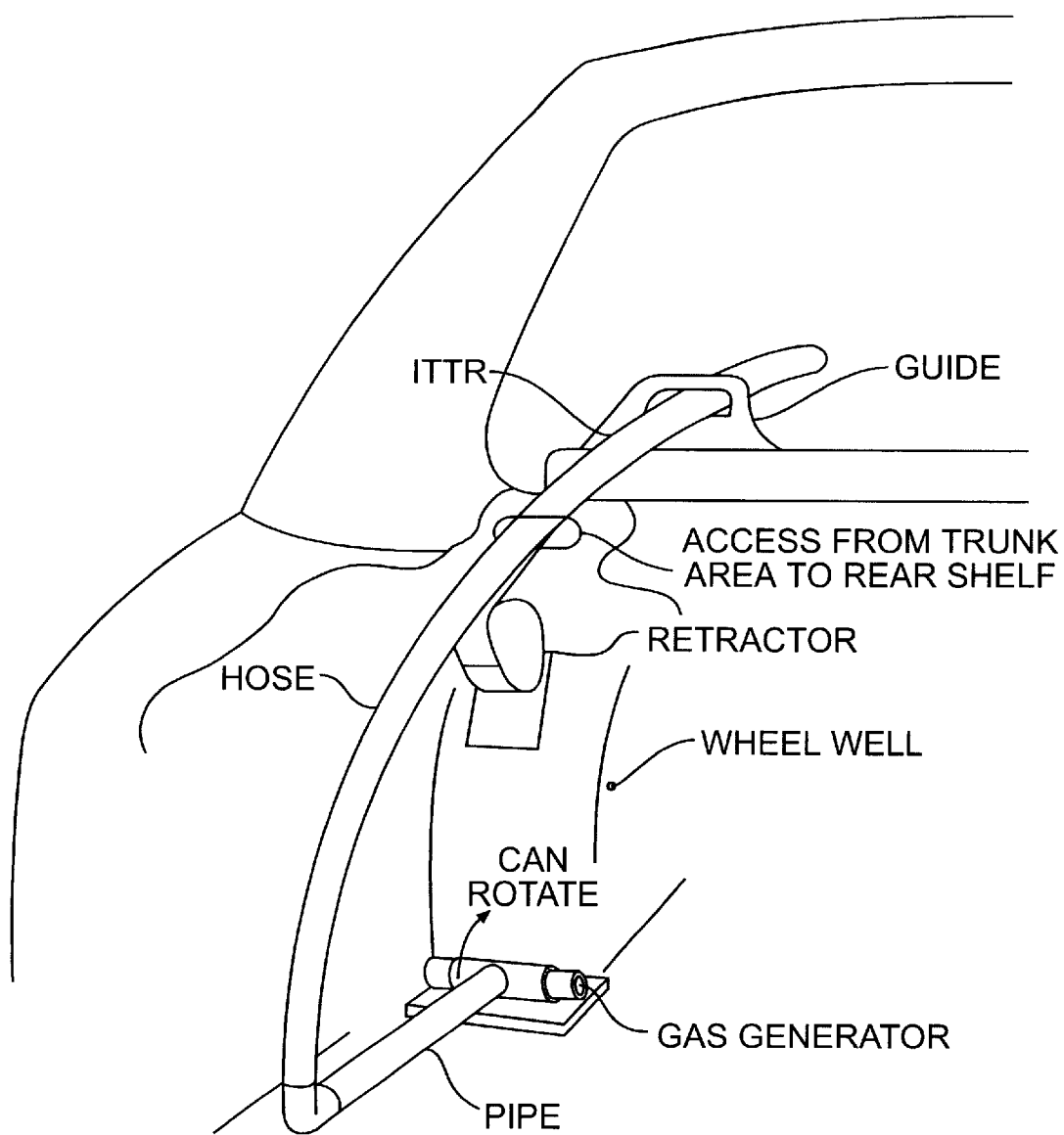
FIGS. 7a–7b are a schematic diagrams of a rear seat installation of the present invention (using a rigid pipe), when the passenger is sitting back in the seat (FIG. 7a) and when the passenger is leaning forward (FIG. 7b).
Figure 7B:
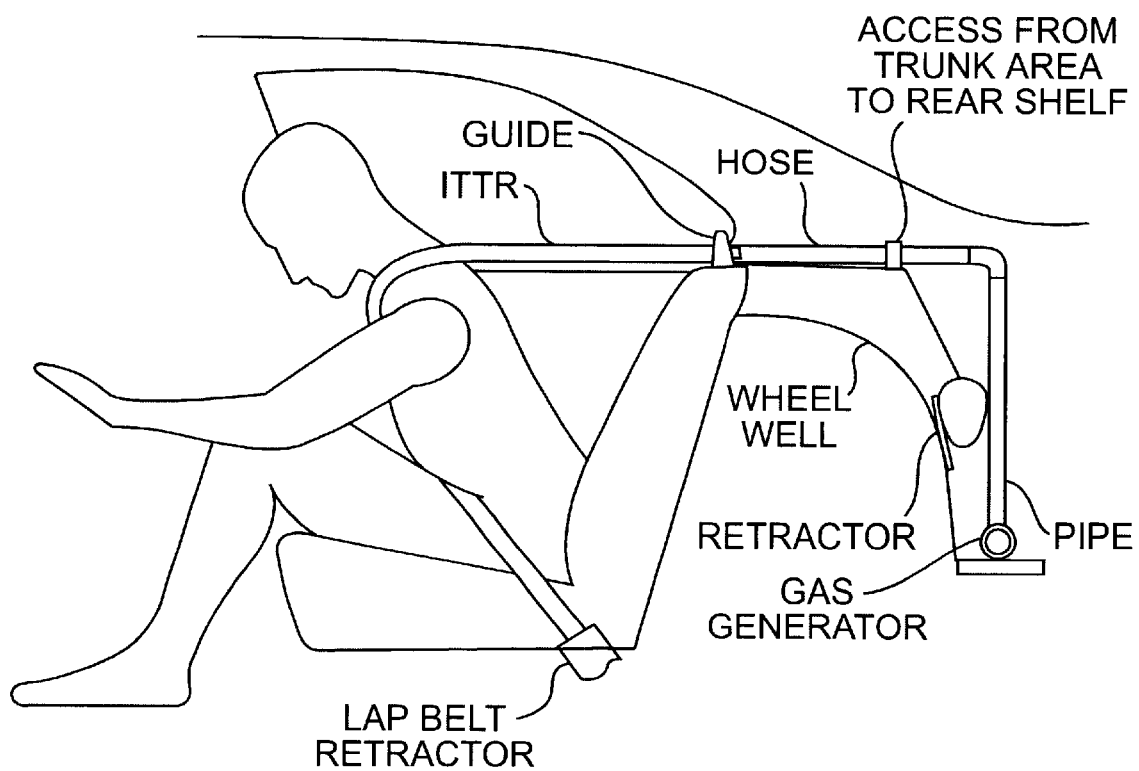
Figure 8A:
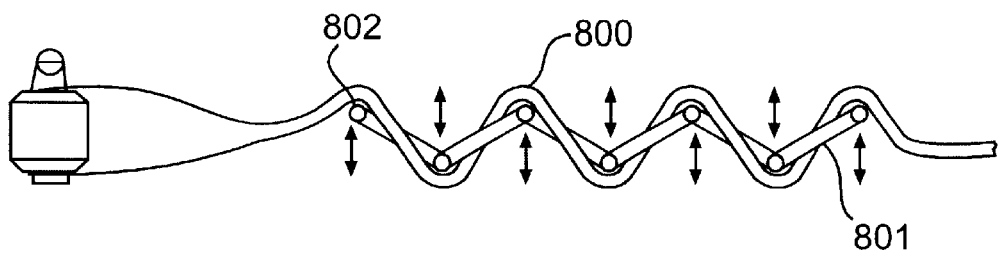
FIGS. 8a–8c are schematic diagrams of a rear seat installation of the present invention using torsion springs to maintain tension on the inflatable structure.
Figure 8B:
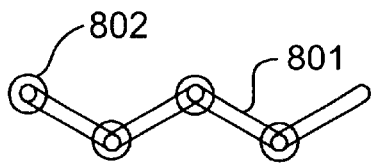
Figure 8C:
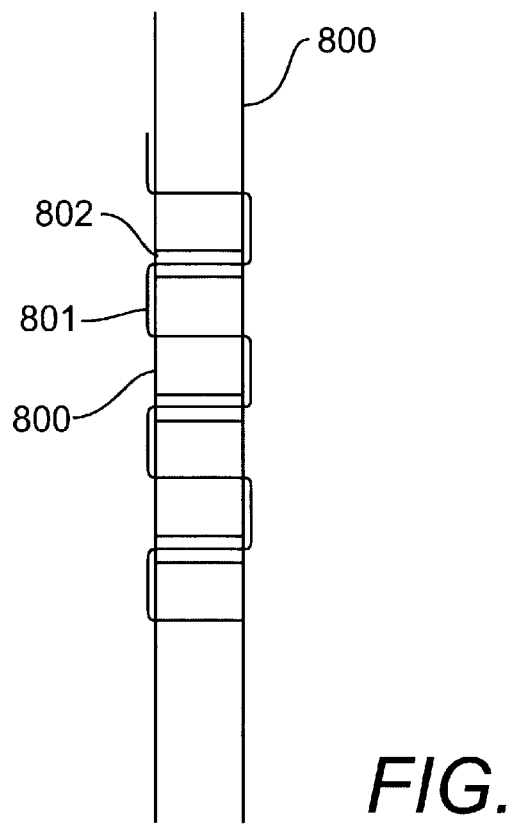

FIGS. 8a–8c illustrate an alternative to the embodiment shown in FIGS. 7a–7b. The embodiment of FIGS. 8a–8c uses a flexible hose, and a flexible retractor to maintain tension of the inflatable structure. The flexible retractor includes torsion 801 and rollers 802 to hold flexible 800 under tension.

Figure 9:
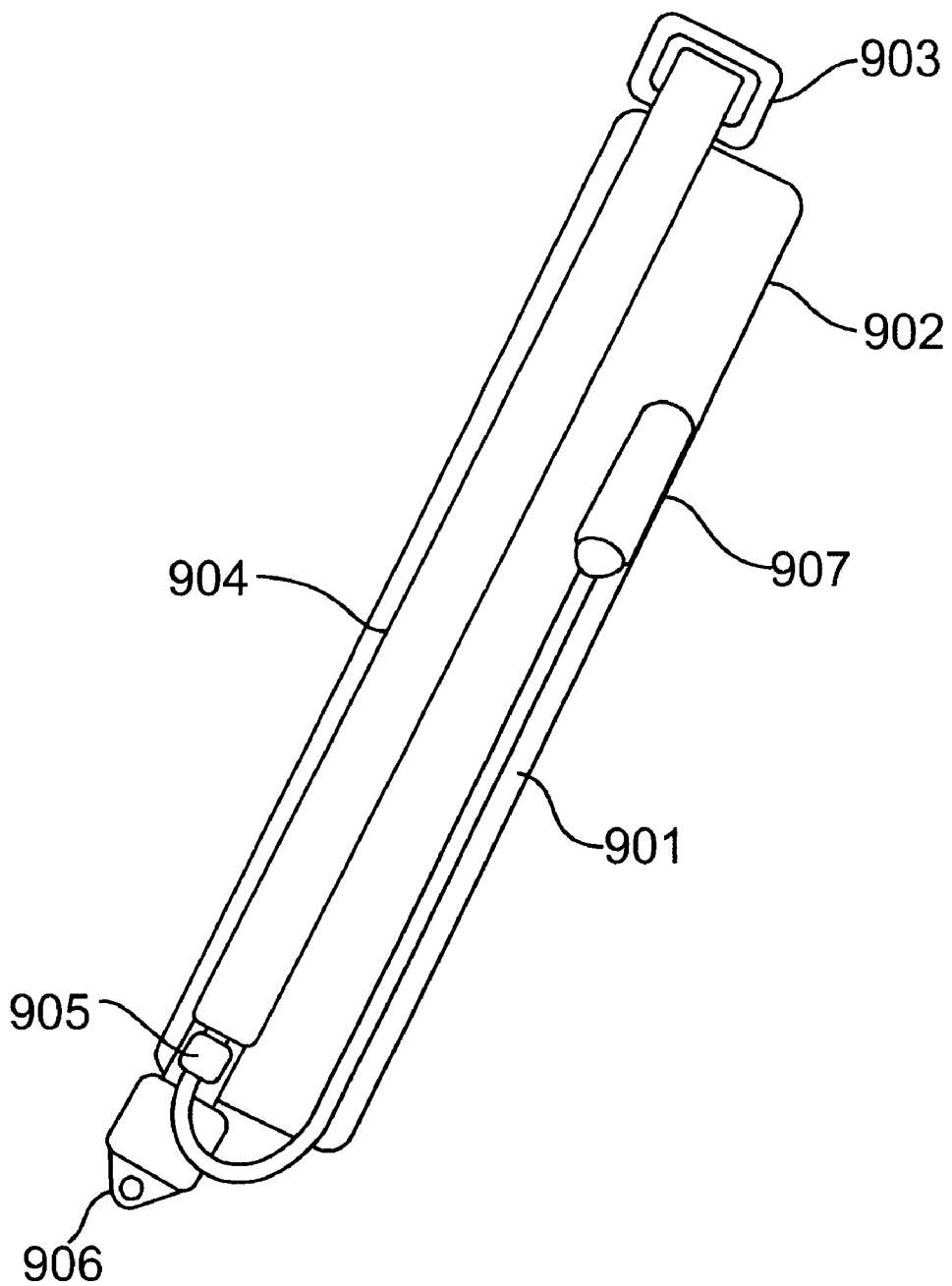
FIG. 9 is a schematic diagram of a rear seat installation of the present invention, that uses flexible tubing and a channel guide to maintain tension and to provide for variation in occupant size.

FIG. 9 is a schematic diagram of another embodiment of the present invention for rear seat installation similar to that of FIGS. 1a–1e. In this embodiment, fill hose 901 is held in a low-friction channel 902. Fill hose 901 is connected at one end to gas generator 907 and at its opposite end to inflatable structure 904 via connector 905. Fill hose 901 is bent into a U shape or J shape, as shown in FIG. 9, and held in place by channel 902. Retractor 906 reels in or pays out the belt as the occupant sits back or moves forward in her seat. FIG. 9 shows the position of the hose and inflatable structure when the occupant is sitting back in her seat. When the occupant is in a forward position, the "J" shape shown in FIG. 9 becomes much greater (and looks more like a "U") as the end of inflatable structure 904 and connector 905 move up the channel to accommodate the forward position of the occupant. The hose material itself (e.g., nylon) is resilient such that the "J" or "U" shape is maintained as the belt is payed out or reeled in. FIG. 9 also shows D-ring 903 that positions the inflatable structure over the shoulder of the occupant. Graphite powder or other lubricants may be used, if necessary to minimize friction between the hose and the channel.

In yet another embodiment, the present invention provides an inflatable torso belt upper anchor arm having two ends. A first end is pivotally mounted on the side of the seat back or vehicle side structure. The upper end of the inflatable torso belt is securely fastened to the second end of the anchor arm. Preferably the anchor arm is rotationally biased such that slack in the inflatable torso belt is removed. At the same time, the anchor arm is capable of rotating in a direction opposite to a direction that removes slack such that the upper end of the inflatable torso belt is comfortably positioned over an occupant's shoulder regardless of occupant size or height. This embodiment provides a mechanism by which a top-filled inflatable torso belt can be implemented, whereby undesirable wear on the torso belt, due to routing through a conventional D-ring, for example, can be avoided.

The anchor arm in accordance with various embodiments of the present invention can have two legs arranged at about 90 degrees with respect to each other, can be shaped eccentrically or can have a substantially rectangular shape.

In all embodiments, the anchor arm preferably is capable of pivoting to comfortably accommodate an occupant having a size at least within the range of a $5^{th}$ percentile female to a $95^{th}$ percentile male. This is achieved by anchor arm rotation around a pivot point. Further, the anchor arm preferably pivots sufficiently rearward to include a "park" position wherein the inflatable torso belt is substantially stored when the seat is unoccupied, and a "comfort" position wherein the inflatable torso belt is brought forward with a seated passenger when the passenger moves or reaches forward such that it does not constrict upper torso motion of the passenger, thereby allowing normal motion and comfort. The foregoing will be described in more detail below in conjunction with FIGS. 10–15.

Figure 10:
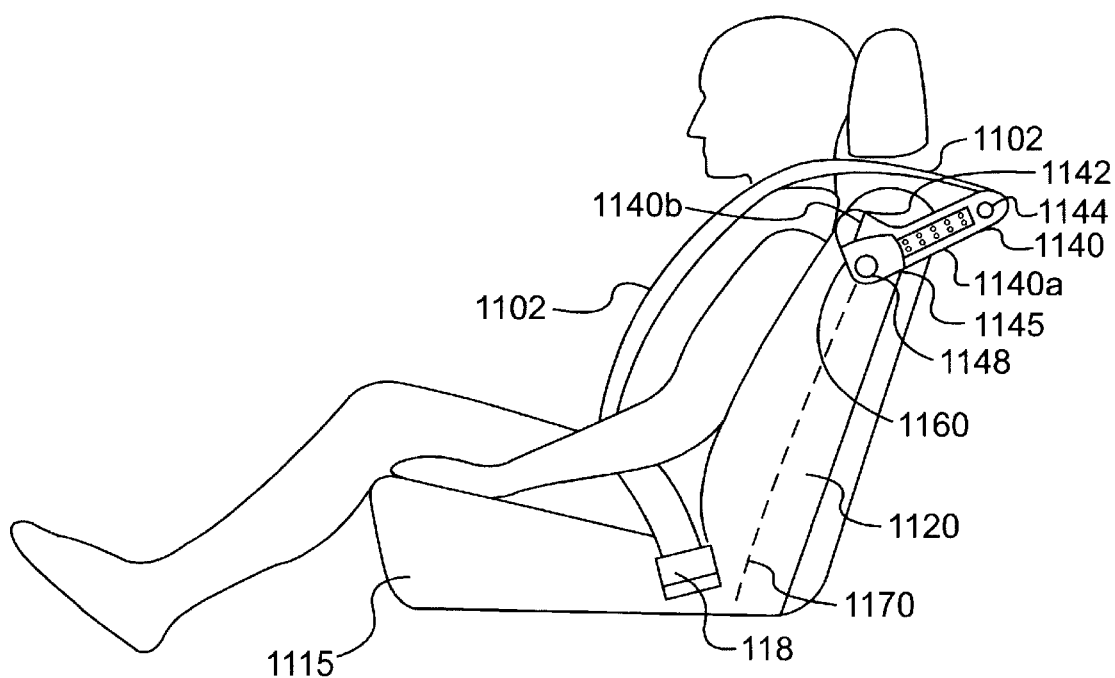
FIG. 10 is a schematic diagram illustrating a top-filled inflatable tube secured to an anchor arm in accordance with a preferred embodiment of the present invention.

FIG. 10 is a schematic diagram illustrating a preferred embodiment of the present invention. Seat pan 1115 and seat back 1120 comprise a typical left side seat in an automobile, or any other vehicle where it is desirable that an occupant is restrained in the event of a sudden stop or crash. A passenger is secured to seat pan 1115 and seat back 1120 by means of lap belt 1101 and inflatable torso belt 1102. Lap belt retractor 1118 operates to eliminate slack in lap belt 1101 and, where the tongue (not shown) of lap belt 1101 may be a slip-type tongue, may also operate to eliminate slack in inflatable torso belt 1102. Lap belt retractor 1118 preferably is an inertial type retractor which locks-up in the event of a sudden stop or crash. Inertial type retractors are well known in the art.

Inflatable torso belt 1102 is attached at its upper end at point 1185 (shown, e.g., in FIGS. 11A–1D) to anchor arm 1140, which preferably has two legs 1140a, 1140b. These legs preferably are arranged at about a 90 degree angle with respect to each other. However, other angles between legs 1140a, 1140b, either acute or obtuse, may also be implemented. Specifically, acute angles down to about 45 degrees and obtuse angles up to 180 degrees are intended to be within the scope of the present invention.

Anchor arm 1140 preferably also includes a surface 1144 over which inflatable torso belt 1102 comes in contact at least under certain anchor arm positions, as will be explained in more detail below.

Anchor arm 1140 preferably is pivotally mounted at pivot point 1148 to seat back 1120 at seat side opening 1145 on the side of seat back 1120. A secure pivotal mounting is important at this connection point as the other end of anchor arm 1140, namely point 1185 on leg 1140a, serves as the upper anchor point for inflatable torso belt 1102. Accordingly, anchor arm 1140 preferably is fabricated from a strong material such as steel or composite material. To achieve the necessary sturdiness, mounting of anchor arm 1140 is preferably effected by a mechanical bushing, bearing, axle or load bearing hinge or pivot capable of transferring occupant crash loads into the seat frame or vehicle structure. Preferably, in the event of a vehicle crash, the pivoting mechanism will lock-up in the same manner as a typical seat belt retractor. Further, the material chosen for anchor arm 1140 preferably has force limiting capabilities such that after a certain level of stress, anchor arm 1140 bends or twists thereby alleviating undue restraint force to a seat occupant. Occupant force limiting can also be integrated into the pivot.

Further, anchor arm 1140 preferably is spring loaded or is otherwise continuously biased in a clockwise direction around pivot point 1148. Of course, for a right hand seat, the biasing would be in the counterclockwise direction. Various mechanisms for achieving the desired biasing are well known to those skilled in the art and thus will not be described herein. However, mechanisms consistent with those commonly used in seat belt retractor design, i.e., coil springs, torsion bars, are preferably used in conjunction with the present invention.

In accordance with the present invention, anchor arm 1140 functions as the automatic height adjustable upper anchor point for a three-point passenger restraint system and is particularly well-suited to operate with an inflatable torso belt 1102. That is, in accordance with the present invention, because anchor arm 1140 is continually rotationally biased (clockwise for right hand seat), any slack existing in inflatable torso belt 1102 is taken up by the pivoting action of anchor arm 1140 and occupant height adjustment is provided. Thus, anchor arm 1140, implemented as described above, eliminates the need for a torso belt retractor as well as a height adjuster which are common in three-point passenger restraint systems, and which are generally required with conventional fixed length torso belts and/or fixed tongue restraint systems. Thus, the present invention eliminates two relatively expensive components (torso belt retractor and height adjuster) and, accordingly, results in an overall less expensive occupant restraint system.

Pivoting anchor arm 1140 preferably includes an inertial stopping mechanism which halts counterclockwise rotation (for a left hand seat) in the event of a sudden stop or crash. Such inertial stopping mechanisms are well-known to those skilled in the art. These inertial stopping mechanisms might also provide force limiting function by permitting movement after a threshold amount of force has been applied. Such force limiting could be used alone or in combination with the materials-based force limiting functionality described above.

Figure 13A:
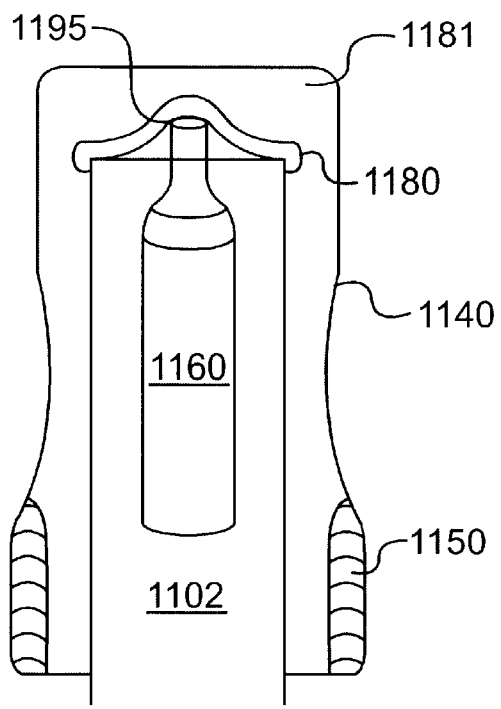
FIGS. 13A and 13B illustrate a preferred configuration for an anchor arm/inflatable belt interface in accordance with the present invention.
Figure 13B:
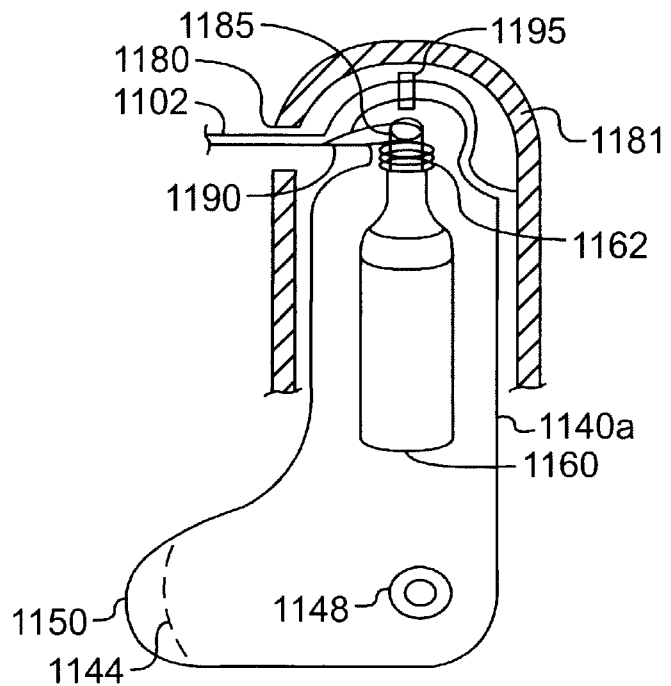

Because of the rotating nature of anchor arm 1140, inflatable torso belt 1102 may contact surface 1144 in varying degrees particularly as the arm travels to park position. To ensure that inflatable torso belt 1102 remains in the proper position (particularly in a non-inflated state), at least a portion of surface 1144 may be bounded by protrusions 1150 that run along the edges of leg 1140b and leg 1140a (FIGS. 13A, 13B). Protrusions 1150 preferably are on the order of 1–10mm high and function to keep inflatable torso belt 1102 within a "groove."

FIG. 10 also shows a gas generator 1160 like those described previously. The gas generator 1160 is shown in more detail in FIGS. 13A and 13B. Gas generator 1160 may be mounted in any suitable orientation that results in a secure flexible or pivotal coupling 1162 between the gas generator and the inflatable tube.

Pivoting anchor arm 1140 preferably has a range of motion that can comfortably accommodate persons of various sizes and, more preferably, passenger sizes ranging from a $5^{th}$ percentile female to a $95^{th}$ percentile male. Further, the range of motion preferably also includes a "park" position and a "comfort" position that are located, respectively, beyond anchor arm positions that accommodate the $5^{th}$ and $95^{th}$ percentile passengers.

FIGS. 11A–11D illustrate the preferred full range of motion of anchor arm 1140. As shown, in the "park" position (FIG. 11A) anchor arm 1140 is rotated fully clockwise around pivot point 1148. Depending on the thickness of seat back 1120, leg 1140a of anchor arm 1140 may extend beyond the back surface of seat back 1120 (see FIG. 10). However, in the majority of other possible positions, leg 1140a preferably is forward of this surface.

Figure 11A:
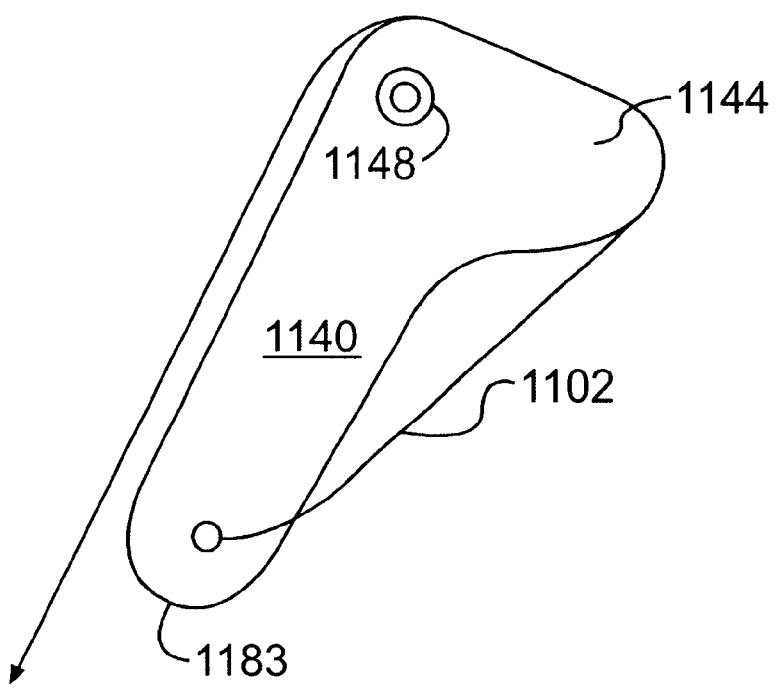
FIGS. 11A–11D illustrate a preferred full possible range of motion of the embodiment depicted in FIG. 10.
Figure 11B:
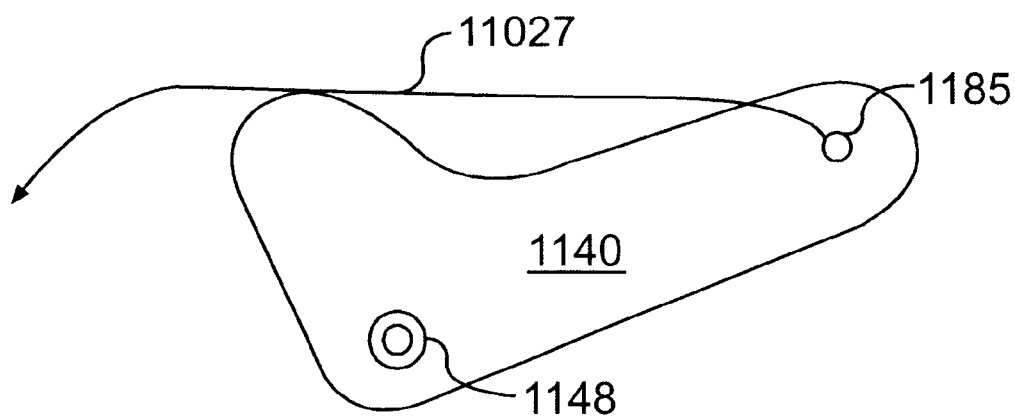
Figure 11C:
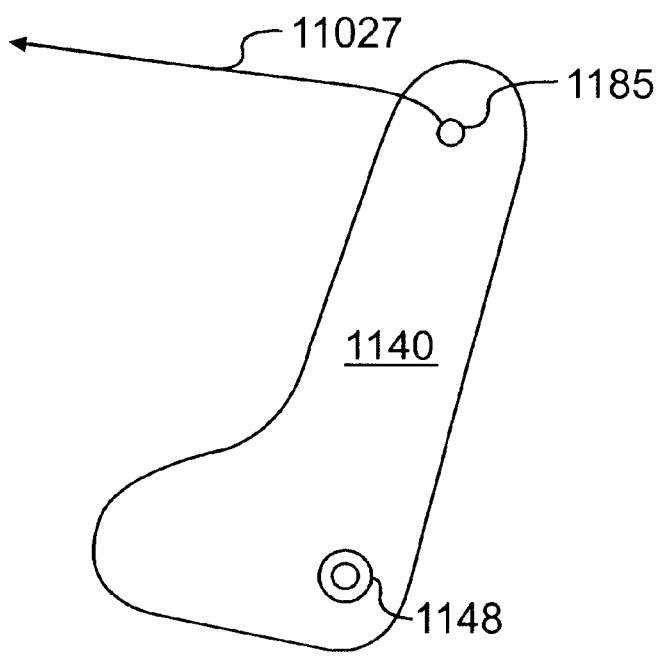
Figure 11D:
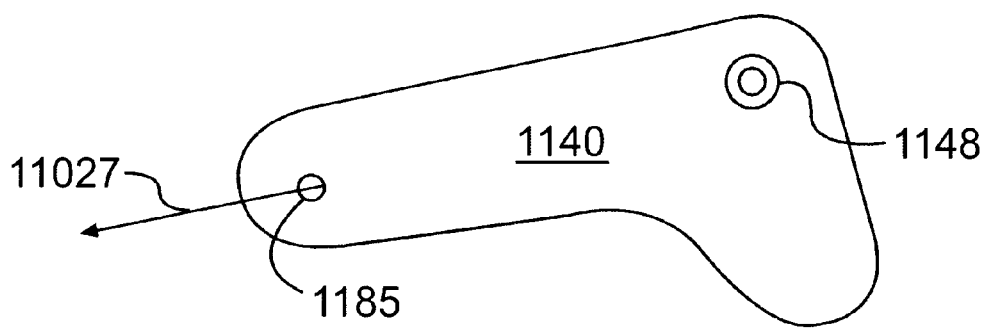

Anchor arm 1140 is capable of rotating continuously through positions that accommodate both in length and in height a $5^{th}$ percentile female through a $95^{th}$ percentile male and preferably is fully stopped at a "comfort" position (FIG. 11D) which allows a passenger the comfort and ease to move or reach forward in their seat even with the correctly adjusted inflatable torso belt in place. FIGS. 11B and 11C illustrate $5^{th}$ and $95^{th}$ percentile rotational positions, respectively.

Table 2 below lists preferred inflatable torso belt length variance dimensions in selected cases in accordance with a preferred embodiment of the present invention. Of course, these dimensions are provided as examples only and may vary depending on seat design, and sizes of legs 1140a and 1140b. In a preferred embodiment, pivot point 1148 and the end of leg 1140a when in the position corresponding to the $95^{th}$ percentile position are aligned substantially with a longitudinal center line 1170 of seat back 1120, e.g., within 10 degrees of center line 1170.

TABLE 2

| Length Reference No. | Location Pair | Length (mm) |
| --- | --- | --- |
| A | Park to $5^{th}$ | 150 |
| B | $5^{th}$ to $95^{th}$ | 175 |
| C | $50^{th}$ to Comfort | 350 |
| D | 95 to Comfort | 225 |
| E | $5^{th}$ to $50^{th}$ | 50 |
| F | Park to $50^{th}$ | 200 |
| G | Park to Comfort | 450 |
| H | Park to $95^{th}$ | 325 |

Figure 12:
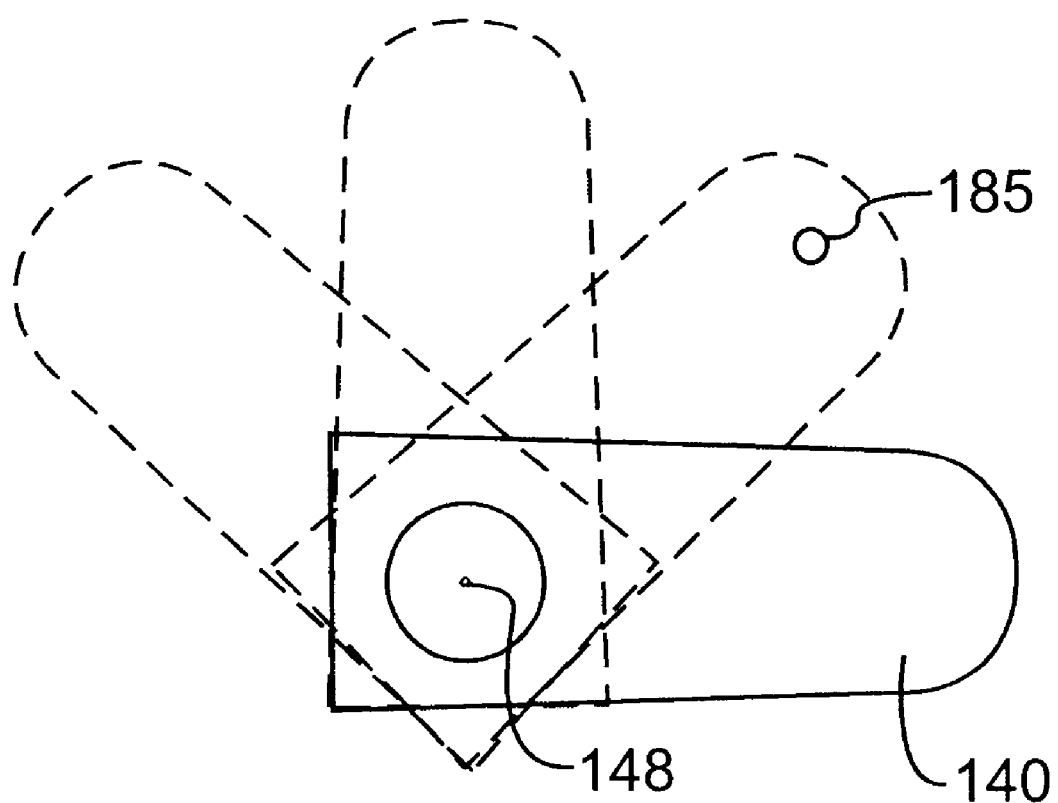
FIG. 12 is a schematic diagram illustrating yet another preferred embodiment of the present invention.

FIG. 12 illustrates another preferred embodiment of the present invention. In this case, anchor arm 1140 has a generally elongate substantially rectangular shape without separate legs. Pivot point 1148 is located at a first end and the inflatable torso belt anchor point is located at a second end. This relatively simpler anchor arm shape may be more suited to certain vehicle classes and/or seat configurations. Further, the simpler shape is less expensive to manufacture. However, this configuration may result in some reduction in belt take-up in the park position as compared to the previous embodiment described herein.

The embodiment of FIG. 12 preferably also includes the features of biased pivoting, lock-up and force limiting as described with respect to the embodiment shown in FIG. 10.

FIGS. 13A and 13B illustrate a preferred configuration for an anchor arm/inflatable torso belt interface in accordance with the present invention. This aspect of the present invention is described with reference to the embodiment shown in FIG. 10, but is applicable to all embodiments described herein. Preferably, inflatable torso belt 1102 passes through a cover opening 1180 of cover 1181 which cosmetically encompasses leg 1140a of anchor arm 1140. Then, as shown in detail in FIG. 13B, the belt portion of inflatable torso belt 1102 preferably is wrapped around anchor pin 1185, which is itself structurally secured to leg 1140a and accessible via opening 1180. The belt portion of inflatable torso belt 1102 preferably is sewn together at region 1190 to secure the belt so that it effectively functions as an upper anchor point in accordance with the present invention. Hose connection 1162 flexibly or pivotally connects inflatable torso belt 1102 and gas generator 1160, via hose clamp 1195, for example. Hose Connection 1162 may be a well-known swivel fitting for a conventional air tool, for example.

Figure 14:
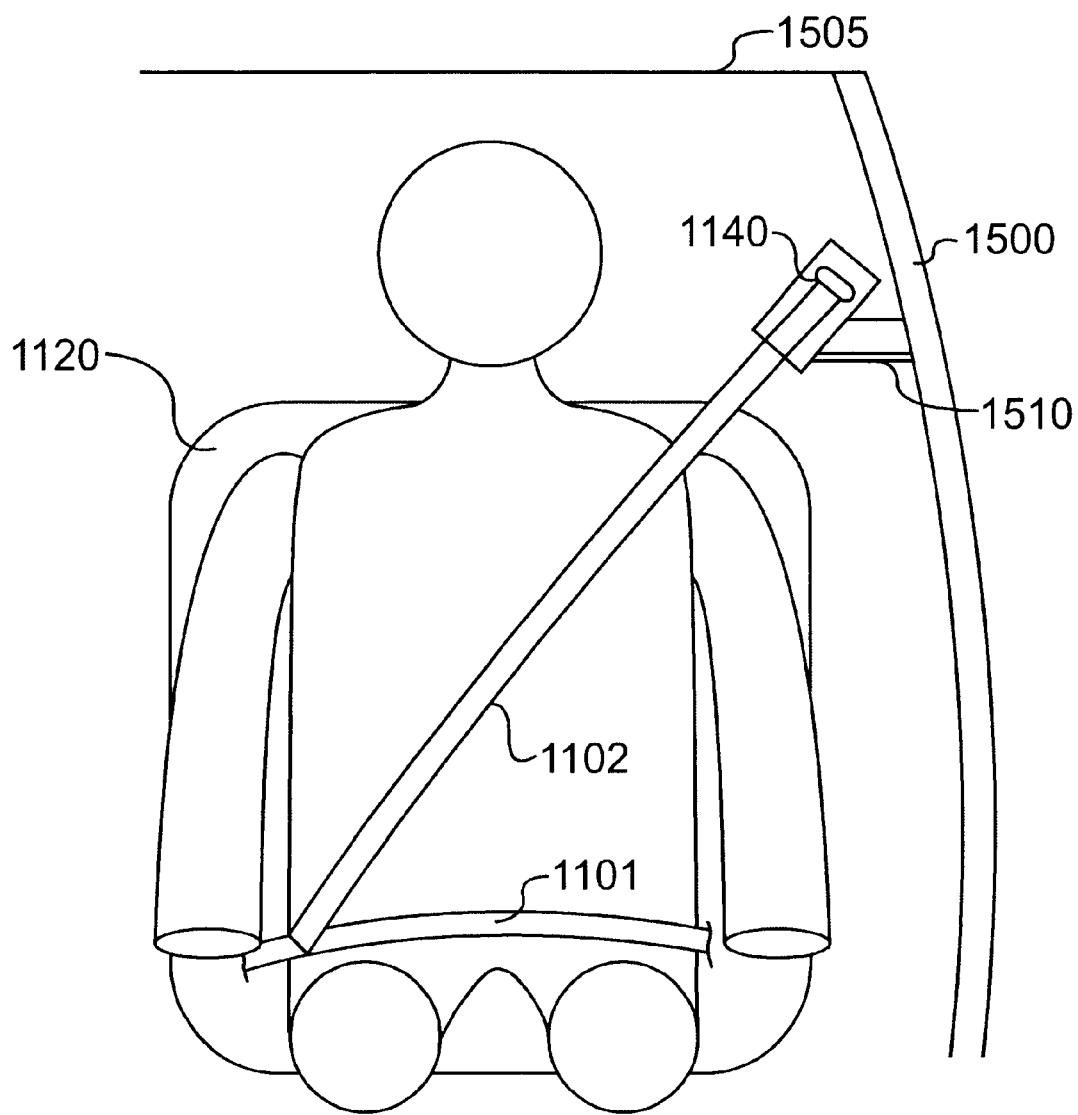
FIG. 14 illustrates an alternative anchor arm embodiment in accordance with the present invention.

In still another embodiment of the present invention, anchor arm 1140 is mounted to a side structure of the vehicle, as shown in FIG. 14. Anchor arm 1140 preferably is mounted to a vehicle side structure 1500, which supports, for example, the vehicle's roof 1505 and door (not shown). Anchor arm 1140 preferably is mounted on a support 1510. As shown, anchor arm 1140 may be mounted on an angle such that the axis of rotation of the anchor arm is substantially perpendicular to a longitudinal dimension of the inflatable torso belt. In this embodiment, the gas generator preferably is located within the side structure.

Figure 15:
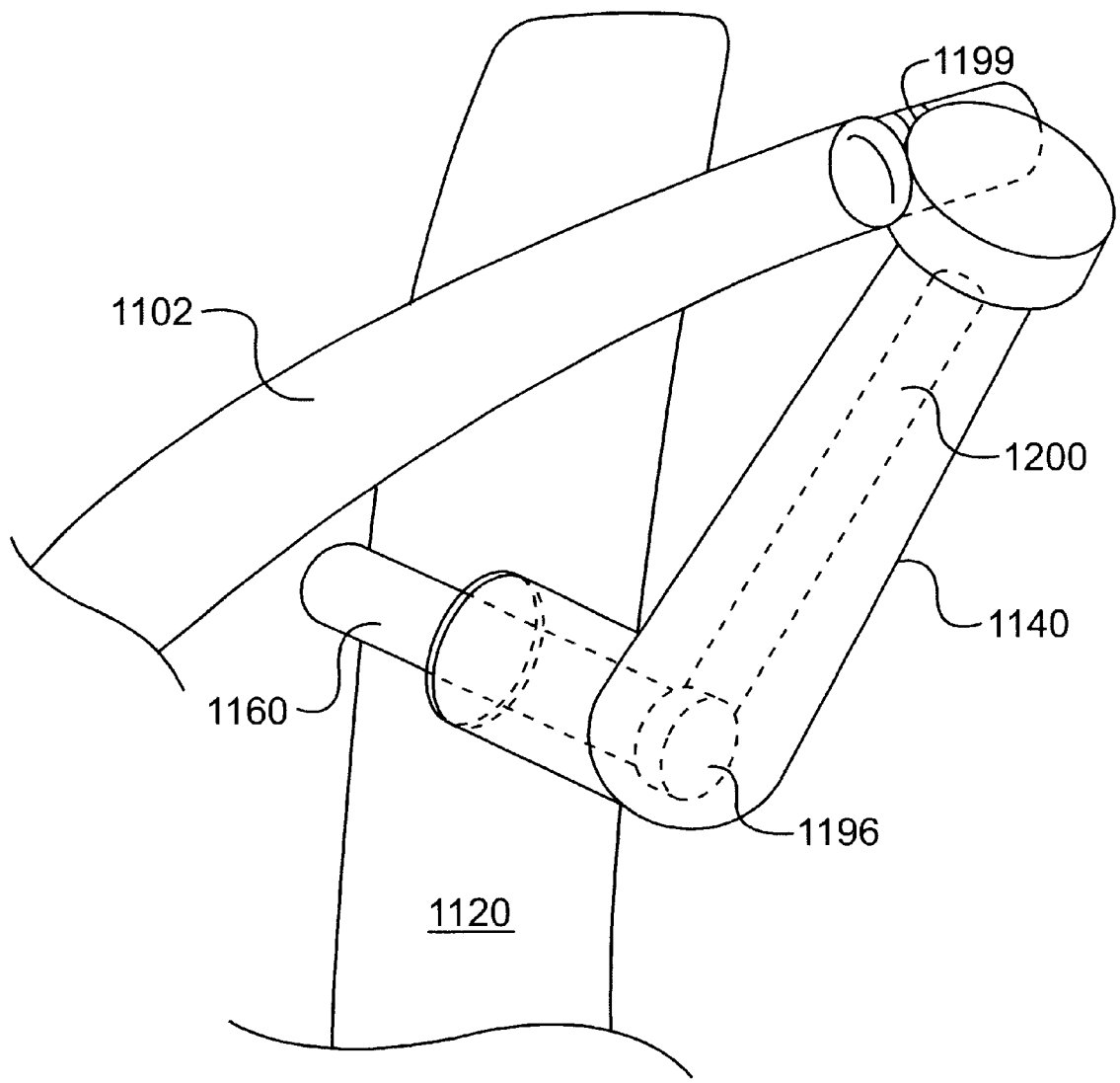
FIG. 15 illustrates another embodiment in accordance with the present invention.

Still another embodiment of the present invention is illustrated in FIG. 15. In this embodiment gas generator 1160 is stored in the seat back 1120 itself, in such a way that the need for a hose is eliminated. Preferably, a pivotable seal 1196 is provided at the junction of the fixed gas generator and pivoting arm 1140 within a cavity of anchor firm 1140. Inflatable torso belt 1102 is in communication with the output of gas generator 1160 via tube 1200 and outlet 1199. This embodiment preferably also includes the biasing, lock-up and force limiting features described previously.

In an alternative embodiment (not shown) the position of anchor arm 1140 is controlled by an electric motor. The motor may be controlled directly via a switch operable by a passenger or a memory may be employed to store desired anchor arm positions and automatically position the anchor arm when the particular passenger is identified by, e.g., weight.

Thus, it is readily appreciated that the present invention provides an improved occupant restraint system by, among other things, eliminating a conventional torso belt retractor and D-ring height adjusting assembly while still providing safety and comfortable accommodation for passengers of various sizes within a restraining system having an inflatable torso belt.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

TABLE 1

OCCUPANT RESTRAINT TEST RESULTS

|  | 3 pt | Air Belt 1 | Air Belt 2 | Present Invention |
|---|---|---|---|---|
| FRONTAL IMPACT | | | | |
| Displacement (inches) | 20.5 | 18.0 | 14.5 | 5.0 |
| Rotation, (degrees) | 110 | 61 | 42 | 28 |
| HIC | 129 | 406 | 194 | 99 |
| $C_R$, (g's) | 32 | 51 | 27 | 26 |
| Torso belt, (lbs) | 1,466 | 790 | 618 | 500 |
| Lap belt (lbs) | 1,534 | 1,294 | 1,193 | 554 |
| Pressure (psi) | NA | 16.0 | 45.4 | 33.4 |
| LATERAL IMPACT | | | | |
| Displacement (inches) | 23.0 | 24.0 | 20.5 | 15.3 |
| Rotation, (degrees) | 86 | 74 | 15 | 50 |
| HIC | 121 | 126 | 73 | ND |
| $C_R$, (g's) | 53 | 20 | ND | 35 |
| Torso belt, (lbs) | 709 | 421 | 410 | 417 |
| Lap belt (lbs) | 595 | 693 | 700 | 383 |
| Pressure (psi) | NA | 17.3 | 40.6 | 31.3 |

What is claimed is:

1. A seat restraint system for a vehicle seat in a vehicle comprising:
   (a) a torso belt comprising an inflatable structure that contracts substantially in length and increases substantially in cross-sectional area when it is fully inflated, wherein the inflatable structure assumes a flat configuration prior to inflation;
   (b) a gas generator fluidly connected to the inflatable structure;
   (c) a crash sensor electrically connected to the gas generator, the crash sensor initiating generation of gas by the gas generator when an impact is detected such that the inflatable structure is fully inflated; and
   (d) an anchor arm pivotally mounted to one of the seat and a vehicle side structure,
   wherein one end of the torso belt is secured to the anchor arm and the anchor arm is rotationally biased to remove slack in the torso belt so that a full range of adult occupant sizes may be safely and comfortably accommodated.

2. The seat restrain system of claim 1, wherein the anchor arm has two legs.

3. The seat restraint system of claim 2, wherein the anchor arm is pivotally mounted to one end of one of the two legs and the torso belt is attached to the other of the one leg.

4. The seat restraint system of claim 3, wherein the anchor arm comprises a surface upon which the torso belt rests.

5. The seat restraint system of claim 3, wherein the anchor arm accommodates passengers in a size range of a $5^{th}$ percentile female to a $95^{th}$ percentile male.

6. The seat restraint system of claim 3, further comprising a hose between the inflatable structure and the gas generator, wherein the hose is fluidly connected to the gas generator on one end and fluidly connected to the inflatable structure at its other end.

7. The seat restraint system of claim 1, wherein the anchor arm is an eccentric anchor arm.

8. The seat restraint system of claim 1, wherein the inflatable structure comprises a braided tube.

9. The seat restraint system of claim 1, wherein the inflatable structure comprises an extruded net.

10. The seat restraint system of claim 1, wherein the anchor arm locks upon detection of a vehicle crash condition.

11. The seat restraint system of claim 1, wherein the anchor arm is rotatable to park and comfort reach positions.

12. The seat restraint system of claim 1, wherein the inflatable structure comprises a woven net.

13. The seat restraint system of claim 1, wherein the inflatable structure further comprises a protective sheath.

14. The seat restraint system of claim 1, further comprising a lap belt, wherein the lap belt and the torso belt form one continuous strap.

15. The seat restraint system of claim 14, wherein the continuous strap passes through a first component of a buckle assembly, further comprising a buckle strap attached to a second component of the buckle assembly, the buckle strap being pivotally mounted to the vehicle.

16. The seat restraint system of claim 1, wherein the gas generator is mounted in the anchor arm.

17. The seat restraint system of claim 1, wherein the gas generator is mounted inside the seat back.

18. A seat restraint system for a seat in a vehicle, comprising:
   (a) a belt comprising a torso belt portion and a lap belt portion, the torso belt portion comprising an inflatable structure that contracts substantially in length and increases substantially in cross-sectional area when it is fully inflated, wherein the inflatable structure assumes a flat configuration prior to inflation;
   (b) a gas generator fluidly connected to the inflatable structure;
   (c) a crash sensor electrically connected to the gas generator, the crash sensor initiating generation of gas by the gas generator when an impact is detected such that the inflatable structure is fully inflated;
   (d) an anchor arm pivotally mounted to one of the seat and a vehicle side structure;
   (e) a buckle assembly, the belt passing through a first component of the buckle assembly; and
   (f) a buckle strap connected to a second component of the buckle assembly, the buckle strap being pivotally attached to the vehicle, wherein the torso belt is secured to the anchor arm and the inflatable structure is fillable via the anchor arm.

19. The seat restraint system of claim 18, wherein the anchor arm is rotationally biased to remove slack in the torso belt.

20. The seat restraint system of claim 18, wherein the inflatable structure is fluidly connected to a hose, and wherein the hose is in turn fluidly connected to the gas generator.

21. The seat restraint system of claim 18, wherein the anchor arm comprises two legs.

22. The seat restraint system of claim 21, wherein the anchor arm is an eccentric anchor arm.

23. The seat restraint system of claim 18, wherein the inflatable structure comprises a braided tube.

24. The seat restraint system of claim 18, wherein the inflatable structure comprises an extruded net.

25. The seat restraint system of claim 24, wherein the extruded net comprises intersecting fibers joined at intersections forming longitudinal angles which increase from 5°–15° prior to inflation, to 90°–150° after inflation, when the inflatable structure is fully inflated without tension.

26. The seat restraint system of claim 25, wherein the longitudinal angles increase to 90°–110° after inflation.

27. The seat restraint system of claim 18, wherein the inflatable structure comprises a woven net.

28. The seat restraint system of claim 18, wherein the inflatable structure is a braided tube within a protective sheath.

29. A seat restraint system, comprising:
(a) a belt having a lap belt portion, and a torso belt portion, wherein the lap belt portion is attached to an inertial reel pivotally attached to a seat or the vehicle, and wherein the belt is attached to a first portion of a buckle assembly at the end of the lap portion of the belt and at the beginning of the torso belt portion of the belt;
(b) an inflatable structure comprising part of the torso belt, the inflatable structure being secured to an anchor arm pivotally mounted to the seat or vehicle;
(c) a gas generator fluidly connected to the inflatable tubular structure; and
(d) a strap attached at one end to a second portion of the buckle assembly, and anchored to the seat or vehicle at the other end,
wherein the inflatable structure increases its cross-sectional area by at least 50% and reduces its length by at least about 20%, when it is fully inflated in an unconstrained state.

30. The seat restraint system of claim 29, wherein the anchor arm is capable of positioning the torso belt to accommodate a passenger size in the range of a $5^{th}$ percentile female to a $95^{th}$ percentile male.

31. The seat restraint system of claim 29, wherein the inflatable structure is fluidly connected to a hose.

32. The seat restraint system of claim 29, wherein the gas generator is mounted in the anchor arm.

33. The seat restraint system of claim 29, wherein the anchor comprises a first and a second leg, wherein one end of the first leg is pivotally mounted to the seat and the torso belt is secured to the other end of the first leg.

34. The seat restraint system of claim 29, wherein the inflatable structure comprises a braided tube.

35. The seat restraint system of claim 29, wherein the inflatable structure comprises an extruded net.

36. The seat restraint system of claim 35, wherein the extruded net comprises intersecting fibers joined at intersections forming longitudinal angles which increase from 5°–15° prior to inflation, to 90°–150° after inflation, when the inflatable structure is fully inflated without tension.

37. The seat restraint system of claim 36, wherein the longitudinal angles increase to 90°–110° after inflation.

38. The seat restraint system of claim 29, wherein the inflatable structure comprises a woven net.

39. The seat restraint system of claim 29, wherein the anchor arm includes protrusions.

40. A seat restraint system for a seat in a vehicle, comprising:
(a) a lap belt and a torso belt, the lap belt being secured on one end thereof to one of the seat and the vehicle, the torso belt comprising an inflatable tubular structure;
(b) an anchor arm pivotally mounted to one of a side surface of the seat and a vehicle side structure, wherein one end of the torso belt is secured to the anchor arm; and
(c) a gas generator fluidly connected to the inflatable tubular structure,
wherein the anchor is rotationally biased to remove slack in the torso belt and locks up in the event of a vehicle crash condition.

41. The system of claim 40, wherein the inflatable structure comprises a braided tube.

42. The system of claim 40, wherein the inflatable structure comprises an extruded net.

43. The system of claim 40, wherein the inflatable structure comprises a woven net.

44. The system of claim 40, wherein the gas generator is mounted in a seat back of the seat.

45. The system of claim 40, wherein the gas generator is mounted within the anchor arm.

46. The system of claim 40, wherein the anchor arm has force limiting properties.

47. The system of claim 40 wherein the anchor comprises two legs.

48. The system of claim 40, wherein the anchor arm is an eccentric anchor arm.

49. The system of claim 40, wherein the anchor arm is a substantially rectangular anchor arm.

50. The system of claim 40, wherein the anchor arm is rotatable to park and comfort positions.

* * * * *